(12) United States Patent
Sato

(10) Patent No.: US 6,226,101 B1
(45) Date of Patent: May 1, 2001

(54) DOT RECORDING USING SPECIFIC SCHEMES AT THE END OF RECORDING MEDIUM

(75) Inventor: Akito Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/141,018

(22) Filed: Aug. 27, 1998

(30) Foreign Application Priority Data

| Sep. 4, 1997 | (JP) | 9-257662 |
| Jan. 21, 1998 | (JP) | 10-025117 |
| Aug. 18, 1998 | (JP) | 10-249138 |

(51) Int. Cl.⁷ .................................................. G06F 15/00
(52) U.S. Cl. .............................. 358/1.8; 358/1.9; 358/502
(58) Field of Search .......................... 358/1.8, 1.9, 502, 358/474, 296

(56) References Cited

U.S. PATENT DOCUMENTS

| 4,063,254 | 12/1977 | Fox et al. ................................... 346/75 |
| 4,198,642 | 4/1980 | Gamblin ..................................... 346/75 |
| 5,923,823 | * 7/1999 | Hirawa ................................... 395/109 |
| 5,953,496 | * 9/1999 | Ishida et al. ........................... 395/108 |
| 6,002,841 | * 12/1999 | Tanioka .................................... 395/109 |
| 6,062,673 | * 5/2000 | Omo et al. ............................... 347/40 |
| 6,072,590 | * 6/2000 | Sano et al. ............................. 358/1.9 |

FOREIGN PATENT DOCUMENTS 7-242025    9/1995    (JP) .

* cited by examiner

*Primary Examiner*—Joseph Mancuso
*Assistant Examiner*—Douglas Tran
(74) *Attorney, Agent, or Firm*—Oblon, Spivak, McClelland, Maier & Neustadt, P.C.

(57) ABSTRACT

Dot recording is carried out according to a first recording mode in the vicinity of an upper end of a record execution area on a recording medium, according to a second recording mode in a middle portion of the record execution area, and according to a third recording mode in the vicinity of a lower end of the record execution area. The third is different from the second recording mode at least in a sub-scan feed amount. In order to use a predetermined sub-scan feed pattern for a selected one of the first recording mode and the third recording mode, sub-scan feed pattern in the other mode is determined.

21 Claims, 34 Drawing Sheets

EXAMPLE OF UPPER END RECORDING WHEN ADJUSTMENT BY LOWER END RECORDING IS CARRIED OUT

Fig. 6A
ARRANGEMENT OF NOZZLE ARRAYS
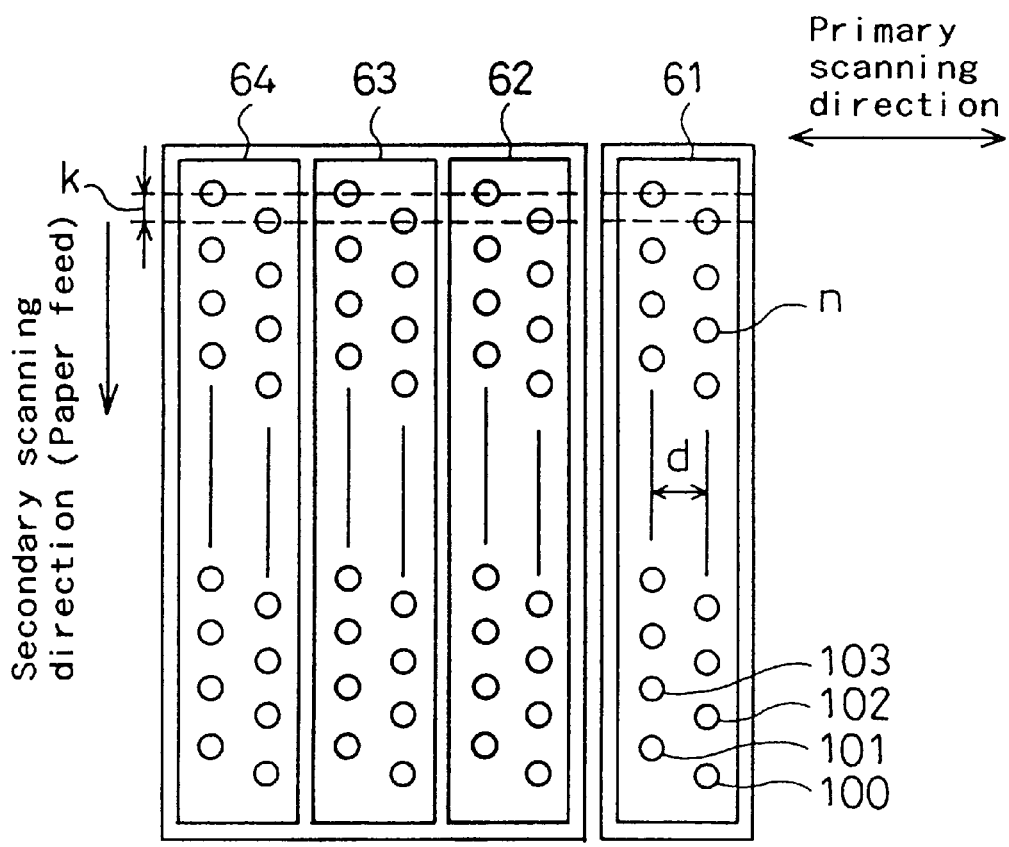
Fig. 6B DOTS FORMED BY ONE NOZZLE ARRAY
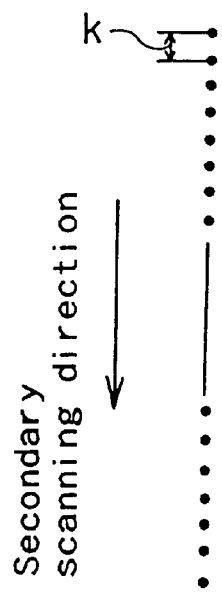

CONCEPT OF SECONDARY SCANNING FEED (s=1)

Fig. 7B  PARAMETERS

Nozzle pitch k : 3 [dots]
Number of nozzles used N : 4
Number of repeats of scan s : 1
Number of effective nozzles Neff : 4

| Number of secondary scanning feeds | 0 | 1 | 2 | 3 |
|---|---|---|---|---|
| Quantity of feed L (dots) | 0 | 4 | 4 | 4 |
| $\Sigma L$ | 0 | 4 | 8 | 12 |
| $F = (\Sigma L) \% k$ | 0 | 1 | 2 | 0 |

PARAMETERS

Nozzle pitch k : 3 [dots]
Number of nozzles used N : 4
Number of repeats of scan s : 2
Number of effective nozzles Neff: 2

| Number of secondary scanning feeds | 0 | 1 | 2 | 3 | 4 | 5 | 6 |
|---|---|---|---|---|---|---|---|
| Quantity of feed L (dots) | 0 | 2 | 2 | 2 | 2 | 2 | 2 |
| ΣL | 0 | 2 | 4 | 6 | 8 | 10 | 12 |
| F = (ΣL) % k | 0 | 2 | 1 | 0 | 2 | 1 | 0 |

DOT RECORDING SCHEME FOR MIDDLE AREA RECORDING SUB-SCAN FEEDS

Fig. 9B  PARAMETERS

NOZZLE PITCH k :4[dot]
NUMBER OF USED NOZZLES N :8
NUMBER OF SCAN REPEATS s :2
NUMBER OF EFFECTIVE NOZZLES Neff:4

| SUB-SCAN FEEDS | 0 | 1 | 2 | 3 | 4 | 5 | 6 | 7 | 8 |
|---|---|---|---|---|---|---|---|---|---|
| FEED AMOUNT L[dot] | 0 | 5 | 2 | 3 | 6 | 5 | 2 | 3 | 6 |
| ΣL | 0 | 5 | 7 | 10 | 16 | 21 | 23 | 26 | 32 |
| F=(ΣL)% k | 0 | 1 | 3 | 2 | 0 | 1 | 3 | 2 | 0 |

EXAMPLE OF UPPER END RECORDING WHEN ADJUSTMENT BY LOWER END RECORDING IS CARRIED OUT

EXAMPLE 1 OF LOWER END RECORDING IN FIRST EMBODIMENT (No. 1)

EXAMPLE 2 OF LOWER END RECORDING IN FIRST EMBODIMENT (No. 1)

EXAMPLE 2 OF LOWER END RECORDING IN FIRST EMBODIMENT (No. 2)

EXAMPLE 3 OF LOWER END RECORDING IN FIRST EMBODIMENT (No. 1)

EXAMPLE 3 OF LOWER END RECORDING IN FIRST EMBODIMENT (No. 2)

EXAMPLE 4 OF LOWER END RECORDING IN FIRST EMBODIMENT (No. 1)

EXAMPLE 4 OF LOWER END RECORDING IN FIRST EMBODIMENT (No. 2)

EXAMPLE 1 OF UPPER END RECORDING IN SECOND EMBODIMENT
(EXAMPLE OF MINIMUM UPPER END RECORDING)

Fig. 27

RECORDING PATTERN OF EXAMPLE 1 OF UPPER END RECORDING IN SECOND EMBODIMENT

FEED: SUB-SCAN FEED AMOUNT AFTER EACH MAIN SCAN
EVEN/ODD: RECORDING POSITION ON THE RASTER LINE IN THE MAIN SCANNING DIRECTION
1 : ODD POSITION; 2 : EVEN POSITION.

| NOZZLE No. | SUB-SCAN FEEDS (UPPER END RECORDING RANGE) | | | | | | | |
|---|---|---|---|---|---|---|---|---|
| | 0 | 1 | 2 | 3 | 4 | 5 | 6 | 7 |
| #1 | n/a | n/a | n/a | n/a | n/a | n/a | 1 | 4 |
| #2 | n/a | n/a | n/a | n/a | n/a | 2 | 5 | 8 |
| #3 | n/a | n/a | n/a | n/a | 3 | 6 | 9 | 12 |
| #4 | n/a | n/a | n/a | 4 | 7 | 10 | 13 | 16 |
| #5 | n/a | n/a | 1 | 8 | 11 | 14 | 17 | 20 |
| #6 | n/a | 2 | 5 | 12 | 15 | 18 | 21 | 24 |
| #7 | 3 | 6 | n/a | 16 | 19 | 22 | n/a | 28 |
| #8 | 7 | 10 | n/a | n/a | 23 | 26 | 29 | 32 |
| FEED | — | 3 | 3 | 3 | 3 | 3 | 3 | 3 |
| EVEN/ODD | 1 | 2 | 1 | 2 | 2 | 1 | 2 | 1 |

| NOZZLE No. | SUB-SCAN FEEDS (UPPER END RECORDING RANGE) | | | | | | | | | | | | | | |
|---|---|---|---|---|---|---|---|---|---|---|---|---|---|---|---|
| | 8 | 9 | 10 | 11 | 12 | 13 | 14 | 15 | 16 | 17 | 18 | 19 | 20 | 21 | 22 |
| #1 | 9 | 11 | 14 | 20 | 25 | 27 | 30 | 36 | 41 | 43 | 46 | 52 | 57 | 59 | 62 |
| #2 | 13 | 15 | 18 | 24 | 29 | 31 | 34 | 40 | 45 | 47 | 50 | 56 | 61 | 63 | 66 |
| #3 | 17 | 19 | 22 | 28 | 33 | 35 | 38 | 44 | 49 | 51 | 54 | 60 | 65 | 67 | 70 |
| #4 | 21 | 23 | 26 | 32 | 37 | 39 | 42 | 48 | 53 | 55 | 58 | 64 | 69 | 71 | 74 |
| #5 | 25 | 27 | 30 | 36 | 41 | 43 | 46 | 52 | 57 | 59 | 62 | 68 | 73 | 75 | 78 |
| #6 | 29 | 31 | 34 | 40 | 45 | 47 | 50 | 56 | 61 | 63 | 66 | 72 | 77 | 79 | 82 |
| #7 | 33 | 35 | 38 | 44 | 49 | 51 | 54 | 60 | 65 | 67 | 70 | 76 | 81 | 83 | 86 |
| #8 | 37 | 39 | 42 | 48 | 53 | 55 | 58 | 64 | 69 | 71 | 74 | 80 | 85 | 87 | 90 |
| FEED | 5 | 2 | 3 | 6 | 5 | 2 | 3 | 6 | 5 | 2 | 3 | 6 | 5 | 2 | 3 |
| EVEN/ODD | 2 | 1 | 2 | 2 | 1 | 2 | 1 | 1 | 2 | 1 | 2 | 2 | 1 | 2 | 1 |

Fig. 29

RECORDING PATTERN OF EXAMPLE 2 OF UPPER END RECORDING IN SECOND EMBODIMENT

| NOZZLE No. | SUB-SCAN FEEDS (UPPER END RECORDING RANGE) | | | | | | | | | | |
|---|---|---|---|---|---|---|---|---|---|---|---|
| | 0 | 1 | 2 | 3 | 4 | 5 | 6 | 7 | 8 | 9 | 10 |
| 1 | n/a | n/a | n/a | n/a | n/a | n/a | 1 | 4 | 7 | 10 | 13 |
| 2 | n/a | n/a | n/a | n/a | n/a | 2 | 5 | 8 | 11 | 14 | 17 |
| 3 | n/a | n/a | n/a | n/a | 3 | 6 | 9 | 12 | 15 | 18 | 21 |
| 4 | n/a | n/a | n/a | 4 | 7 | 10 | 13 | 16 | 19 | 22 | 25 |
| 5 | n/a | 2 | 5 | 8 | 11 | 14 | 17 | 20 | 23 | 26 | 29 |
| 6 | 3 | 6 | 9 | 12 | 15 | n/a | 21 | 24 | 27 | 30 | 33 |
| 7 | n/a | n/a | n/a | 16 | 19 | n/a | 25 | 28 | 31 | n/a | 37 |
| 8 | n/a | n/a | n/a | n/a | n/a | n/a | n/a | 32 | 35 | n/a | 41 |
| FEED | — | 3 | 3 | 3 | 3 | 3 | 3 | 3 | 3 | 3 | 3 |
| EVEN/ODD | 1 | 2 | 1 | 2 | 2 | 1 | 2 | 1 | 1 | 2 | 1 |

| NOZZLE No. | SUB-SCAN FEEDS (MIDDLE AREA RECORDING RANGE) | | | | | | | | | | | | | | |
|---|---|---|---|---|---|---|---|---|---|---|---|---|---|---|---|
| | 11 | 12 | 13 | 14 | 15 | 16 | 17 | 18 | 19 | 20 | 21 | 22 | 23 | 24 | 25 | ... |
| 1 | 18 | 20 | 23 | 29 | 34 | 36 | 39 | 45 | 50 | 52 | 55 | 61 | 66 | 68 | 71 | ... |
| 2 | 22 | 24 | 27 | 33 | 38 | 40 | 43 | 49 | 54 | 56 | 59 | 65 | 70 | 72 | 75 | ... |
| 3 | 26 | 28 | 31 | 37 | 42 | 44 | 47 | 53 | 58 | 60 | 63 | 69 | 74 | 76 | 79 | ... |
| 4 | 30 | 32 | 35 | 41 | 46 | 48 | 51 | 57 | 62 | 64 | 67 | 73 | 78 | 80 | 83 | ... |
| 5 | 34 | 36 | 39 | 45 | 50 | 52 | 55 | 61 | 66 | 68 | 71 | 77 | 82 | 84 | 87 | ... |
| 6 | 38 | 40 | 43 | 49 | 54 | 56 | 59 | 65 | 70 | 72 | 75 | 81 | 86 | 88 | 91 | ... |
| 7 | 42 | 44 | 47 | 53 | 58 | 60 | 63 | 69 | 74 | 76 | 79 | 85 | 90 | 92 | 95 | ... |
| 8 | 46 | 48 | 51 | 57 | 62 | 64 | 67 | 73 | 78 | 80 | 83 | 89 | 94 | 96 | 99 | ... |
| FEED | 5 | 2 | 3 | 6 | 5 | 2 | 3 | 6 | 5 | 2 | 3 | 6 | 5 | 2 | 3 | ... |
| EVEN/ODD | 2 | 2 | 1 | 2 | 2 | 1 | 2 | 2 | 1 | 2 | 1 | 2 | 1 | 1 | 2 | ... |

Fig. 31

RECORDING PATTERN OF EXAMPLE 1 OF UPPER END RECORDING IN THIRD EMBODIMENT

| NOZZLE No. | SUB-SCAN FEEDS (UPPER END RECORDING RANGE) | | | | | | | |
|---|---|---|---|---|---|---|---|---|
| | 0 | 1 | 2 | 3 | 4 | 5 | 6 | 7 |
| 1 | n/a | n/a | n/a | n/a | 5 | 6 | 7 | 8 |
| 2 | 5 | 6 | 7 | 8 | 9 | 10 | 11 | 12 |
| 3 | 9 | 10 | 11 | 12 | 13 | 14 | 15 | 16 |
| 4 | n/a | 14 | n/a | 16 | 17 | 18 | 19 | 20 |
| 5 | n/a | n/a | n/a | 20 | 21 | 22 | 23 | 24 |
| 6 | n/a | n/a | n/a | n/a | 25 | 26 | 27 | 28 |
| 7 | n/a | n/a | n/a | n/a | n/a | 30 | n/a | 32 |
| 8 | n/a | n/a | n/a | n/a | n/a | n/a | n/a | 36 |
| FEED | — | 1 | 1 | 1 | 1 | 1 | 1 | 1 |
| EVEN/ODD | 1 | 2 | 1 | 2 | 2 | 1 | 2 | 1 |

| NOZZLE No. | SUB-SCAN FEEDS (MIDDLE AREA RECORDING RANGE) | | | | | | | | | | | | | | |
|---|---|---|---|---|---|---|---|---|---|---|---|---|---|---|---|
| | 8 | 9 | 10 | 11 | 12 | 13 | 14 | 15 | 16 | 17 | 18 | 19 | 20 | 21 | 22 |
| 1 | 13 | 15 | 18 | 24 | 29 | 31 | 34 | 40 | 45 | 47 | 50 | 56 | 61 | 63 | 66 |
| 2 | 17 | 19 | 22 | 28 | 33 | 35 | 38 | 44 | 49 | 51 | 54 | 60 | 65 | 67 | 70 |
| 3 | 21 | 23 | 26 | 32 | 37 | 39 | 42 | 48 | 53 | 55 | 58 | 64 | 69 | 71 | 74 |
| 4 | 25 | 27 | 30 | 36 | 41 | 43 | 46 | 52 | 57 | 59 | 62 | 68 | 73 | 75 | 78 |
| 5 | 29 | 31 | 34 | 40 | 45 | 47 | 50 | 56 | 61 | 63 | 66 | 72 | 77 | 79 | 82 |
| 6 | 33 | 35 | 38 | 44 | 49 | 51 | 54 | 60 | 65 | 67 | 70 | 76 | 81 | 83 | 86 |
| 7 | 37 | 39 | 42 | 48 | 53 | 55 | 58 | 64 | 69 | 71 | 74 | 80 | 85 | 87 | 90 |
| 8 | 41 | 43 | 46 | 52 | 57 | 59 | 62 | 68 | 73 | 75 | 78 | 84 | 89 | 91 | 94 |
| FEED | 5 | 2 | 3 | 6 | 5 | 2 | 3 | 6 | 5 | 2 | 3 | 6 | 5 | 2 | 3 |
| EVEN/ODD | 2 | 1 | 2 | 2 | 1 | 2 | 1 | 1 | 2 | 1 | 2 | 2 | 1 | 2 | 1 |

Fig. 33 RECORDING PATTERN OF EXAMPLE 2 OF UPPER END RECORDING IN THIRD EMBODIMENT

| NOZZLE No. | SUB-SCAN FEEDS (UPPER END RECORDING RANGE) | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 1 | n/a | n/a | n/a | n/a | 5 | 6 | 7 | 8 | 9 | 10 | 11 | 12 | 13 | 14 |
| 2 | 5 | 6 | 7 | 8 | 9 | 10 | 11 | 12 | 13 | 14 | 15 | 16 | 17 | 18 |
| 3 | n/a | n/a | n/a | n/a | n/a | n/a | 15 | 16 | 17 | 18 | 19 | 20 | 21 | 22 |
| 4 | n/a | n/a | n/a | n/a | n/a | n/a | n/a | 20 | n/a | 22 | 23 | 24 | 25 | 26 |
| 5 | n/a | n/a | n/a | n/a | n/a | n/a | n/a | n/a | n/a | 26 | 27 | 28 | 29 | 30 |
| 6 | n/a | n/a | n/a | n/a | n/a | n/a | n/a | n/a | n/a | n/a | 31 | 32 | 33 | 34 |
| 7 | n/a | n/a | n/a | n/a | n/a | n/a | n/a | n/a | n/a | n/a | n/a | 36 | n/a | 38 |
| 8 | n/a | n/a | n/a | n/a | n/a | n/a | n/a | n/a | n/a | n/a | n/a | n/a | n/a | 42 |
| FEED | — | 1 | 1 | 1 | 1 | 1 | 1 | 1 | 1 | 1 | 1 | 1 | 1 | 1 |
| EVEN/ODD | 1 | 2 | 1 | 2 | 2 | 1 | 2 | 1 | 1 | 2 | 1 | 2 | 1 | 1 |

| NOZZLE No. | SUB-SCAN FEEDS (MIDDLE AREA RECORDING RANGE) | | | | | | | | | | | | | |
|---|---|---|---|---|---|---|---|---|---|---|---|---|---|---|
| | 14 | 15 | 16 | 17 | 18 | 19 | 20 | 21 | 22 | 23 | 24 | 25 | 26 | 27 | 28 |
| 1 | 19 | 21 | 24 | 30 | 35 | 37 | 40 | 46 | 51 | 53 | 56 | 62 | 67 | 69 | 72 |
| 2 | 23 | 25 | 28 | 34 | 39 | 41 | 44 | 50 | 55 | 57 | 60 | 66 | 71 | 73 | 76 |
| 3 | 27 | 29 | 32 | 38 | 43 | 45 | 48 | 54 | 59 | 61 | 64 | 70 | 75 | 77 | 80 |
| 4 | 31 | 33 | 36 | 42 | 47 | 49 | 52 | 58 | 63 | 65 | 68 | 74 | 79 | 81 | 84 |
| 5 | 35 | 37 | 40 | 46 | 51 | 53 | 56 | 62 | 67 | 69 | 72 | 78 | 83 | 85 | 88 |
| 6 | 39 | 41 | 44 | 50 | 55 | 57 | 60 | 66 | 71 | 73 | 76 | 82 | 87 | 89 | 92 |
| 7 | 43 | 45 | 48 | 54 | 59 | 61 | 64 | 70 | 75 | 77 | 80 | 86 | 91 | 93 | 96 |
| 8 | 47 | 49 | 52 | 58 | 63 | 65 | 68 | 74 | 79 | 81 | 84 | 90 | 95 | 97 | 100 |
| FEED | 5 | 2 | 3 | 6 | 5 | 2 | 3 | 6 | 5 | 2 | 3 | 6 | 5 | 2 | 3 |
| EVEN/ODD | 2 | 1 | 1 | 2 | 1 | 2 | 1 | 1 | 2 | 1 | 1 | 2 | 1 | 2 | 2 |

OVERLAP SCHEME

NUMBER OF NOZZLES: N = 8
NOZZLE PITCH: k = 1 [DOTS]
NUMBER OF SCAN REPEATS: s = 2
NOZZLE DENSITY: D [DOTS/INCH]
SUB-SCANNING PITCH: L [INCH]
DOT PITCH: w [INCH]

DOT RECORDING USING SPECIFIC SCHEMES AT THE END OF RECORDING MEDIUM

BACKGROUND OF THE INVENTION

1. Field of the Invention

The present invention relates to a technique of recording dots on a recording medium with a dot recording head, and more specifically to a dot recording technique using specific recording modes at upper and lower ends of the recording medium to expand a recordable area on the medium.

2. Description of the Related Art

Serial scan-type printers and drum scan-type printers are dot recording devices which record dots with a recording head while carrying out scans both in a main scanning direction and a sub-scanning direction. In these types of printers (especially, ink jet printers), a different recording scheme from that executed in a middle portion of the recording medium is performed in the vicinity of an upper end and a lower end of the recording medium in order to expand the area in which the recording can be carried out. (The area will be hereinafter referred to as the "record execution area" or the "print area".) In this specification, the recording scheme executed in the middle portion of the record execution area is referred to as "middle area recording scheme". The recording process executed in the vicinity of the upper end of the record execution area is referred to as "upper end recording scheme", whereas the recording process executed in the vicinity of the lower end of the record execution area is referred to as "lower end recording scheme".

Prior to the explanation of the upper and lower end recording schemes, the following describes some of the conventional recording schemes adopted for the middle area scheme. As taught by U.S. Pat. No. 4,198,642 and Japanese Patent Laid-Open Gazette No. 53-2040, for example, a technique called the "interlace scheme" has been developed for improving the image (print) quality of printers of this type.

FIG. 34 is a diagram for explaining an example of the interlace scheme. In this specification, the following parameters are used to define printing scheme.

N: Number of nozzles k: Nozzle pitch [dots]

s: Number of scan repeats

D: Nozzle density [nozzle/inch]

L: Sub-scanning pitch [inch]

w: Dot pitch [inch]

The number of nozzles N is the number of nozzles actually used to form dots. In the example of FIG. 34, N=3. The nozzle pitch k is the interval between the centers of the recording head nozzles expressed in units of the recorded image pitch (dot pitch w). In the example of FIG. 34, k=2. The number of scan repeats s is the number of main scans in which all dot positions on a main scanning line are serviced. In the example of FIG. 34, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 34 indicate dot recording positions. As indicated in the legend, the numeral on the left in each circle indicates the nozzle number and the numeral on the right indicates the recording order (the number of the main scan in which it was recorded).

The interlace scheme shown in FIG. 22 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set at a constant value given by $N/(D \cdot k)$.

The interlace scheme makes irregularities in nozzle pitch and ink jetting characteristic to thin out over the recorded image. Because of this, it improves image quality by mitigating the effect of any irregularity that may be present in the nozzle pitch, the jetting characteristic and the like.

The overlap scheme, also known as the multi-scan scheme, taught for example by Japanese Patent Laid-Open Gazette No. 3-207665 and Japanese Patent Publication Gazette No. 4-19030 is another technique used to improve image quality in color ink jet printers.

FIG. 35 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 23, a dot is formed at every second dot position. The timing of the driving of the nozzle sets is controlled so that the each nozzle set forms dots at different positions from the other in the main scanning direction. In other words, as shown in FIG. 35, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the dots of each main scanning line are not all recorded by the same nozzle but by multiple nozzles. Even when the nozzle characteristics (pitch, jetting characteristic etc.) are not completely uniform, therefore, enhanced image quality can be obtained because the characteristics of the individual nozzles is prevented from affecting the entire main scanning line.

In the interlace scheme and the overlap scheme discussed above, the sub-scan feed is carried out by the fixed feed amount L corresponding to a plurality of dots.

The upper and lower end recording scheme is a special printing scheme that is executed in the vicinity of the upper end and the lower end of the record execution area, in order to expand the record execution area of the printer as much as possible. The upper and lower end recording scheme may be carried out, for example, according to the technique disclosed in JAPANESE PATENT LAID-OPEN GAZETTE No. 7-242025, the disclosure of which is herein incorporated by reference. FIG. 9 of this reference shows that printing by the interlace scheme is carried out in the middle portion of the record execution area and that printing by "minute feeding" (the sub-scan feed of one dot) is carried out in the vicinity of the lower end of the record execution area. The lower end of the record execution area is expanded as the result of the lower end recording scheme.

The "minute feeding" shifts the nozzle by one dot at a time in the sub-scanning direction. Irrespective of the type of the sub-scan feed adopted for the middle area scheme, the "minute feeding" applied for the lower end recording scheme can expand the lower end of the record execution area to a desired region. There is, on the other hand, a demand for the recording scheme that applies a sub-scan feed other than the "minute feeding" for the lower end recording scheme. For example, in order to improve the picture quality, there is a demand for the recording scheme whose sub-scan feed amount is a plurality of dots, like the interlace scheme and the overlap scheme. When the sub-scan feed other than the "minute feeding" is applied for the lower end recording scheme, some types of the sub-scan feed adopted for the middle area scheme may cause an unprintable area within the record execution area, which is supposed to be expanded by the lower end recording scheme. In the conventional technique, the sub-scan feed other than the "minute feeding" may thus not be applicable for the lower end recording scheme. Another problem is that application of the sub-scan feed other than the "minute feeding" for the lower end recording scheme makes the lower end recording scheme too complicated in some cases.

SUMMARY OF THE INVENTION

Accordingly, one object of the present invention is to enable a sub-scan feed other than the "minute feeding" to be applied for the lower end recording scheme. Another object of the present invention is to prevent the lower end recording scheme from being too complicated even when the sub-scan feed other than the "minute feeding" is applied for the lower end recording scheme.

In order to attain at least partly he above and other objects of the present invention, there is provided a dot recording apparatus for recording dots on a printing medium with a dot recording head. The apparatus comprises: a dot forming element array formed on the dot recording head, the dot forming element array having a plurality of dot forming elements which form a plurality of dots of an identical color on the printing medium, the plurality of dots being arrayed at a substantially constant pitch in a sub-scanning direction; a main scan drive unit that drives at least one of the dot recording head and the printing medium to carry out a main scan; a head drive unit that drives at least part of the plurality of dot forming elements to produce dots during the main scan; a sub-scan drive unit that drives at least one of the dot recording head and the printing medium to carry out a sub-scan every time when the main scan is completed; and a controller that controls the main scan drive unit, the head drive unit, and the sub-scan drive unit. The controller comprises the functions of: (i) executing dot recording according to a first recording mode in the vicinity of an upper end of a record execution area of the printing medium; (ii) executing dot recording according to a second recording mode in a middle portion of the record execution area; (iii) executing dot recording according to a third recording mode in the vicinity of a lower end of the record execution area, the third recording mode being different from the second recording mode at least in a sub-scan feed amount; and (iv) selecting one of a plurality of sub-scan feed patterns prepared for selected one of the first recording mode and the third recording mode according to a length of the record execution area in the sub-scanning direction such that a predetermined sub-scan feed pattern is used for the other of the first recording mode and the third recording mode irrespective of the length of the record execution area.

Since one of a plurality of sub-scan feed patterns is selected for the selected one of the first recording mode and the third recording mode while a predetermined sub-scan feed pattern is applied for the other recording mode in the above dot recording apparatus, a sub-scan feed other than the "minute feeding" can be applied for the lower end processing. When the sub-scan feed other than the "minute scanning" is applied for the lower end processing, the lower end processing will not become too complicated in the above apparatus.

The function (iv) may include a function of selecting one of the plurality of sub-scan feed patterns prepared for the third recording mode such that the predetermined sub-scan feed pattern is used for the first recording mode, and a function of determining dot positions to be recorded by each dot forming element during each main scan in the third recording mode on the basis of dot recording history down to the lower end of the record execution area in the second recording mode.

In the third recording mode, the dot positions to be recorded by each dot forming element are determined to prevent an unrecordable portion from occurring in the vicinity of the lower end of the record execution area. It should be noted that some part of the lower end of the record execution area is recorded in the second recording mode. The dot positions to be recorded in the third recording mode accordingly depend upon the dot recording history in the second recording mode. By determining the dot positions to be recorded by each dot forming element during the main scan in the third recording mode based on the dot recording history in the second recording mode, occurrence of an unrecordable portion in the record execution area is prevented when the sub-scan feed other than the "minute feeding" is applied for the lower end processing.

The plurality of sub-scan feed patterns prepared for the third recording mode may use mutually different amounts for a transient sub-scan feed, if required, which is carried out at the beginning of the third recording mode, and the function (iv) may include a function of selecting one of the plurality of sub-scan feed patterns for the third recording mode based on the dot recording history down to the lower end of the record execution area.

Since a transient sub-scan feed is carried out, if required, at the beginning of the third recording mode, the record execution area can be expanded even if expansion of the record execution area is difficult when the second recording mode immediately shifts to the third recording mode. This accordingly enables the sub-scan feed other than the "minute feeding" to be adopted for the lower end recording.

The second recording mode may execute sub-scan feeds while repeatedly using a sequence of non-constant feed amounts as one unit cycle, and the third recording mode may execute sub-scan feeds while repeatedly using a constant feed amount corresponding to a plurality of dots after the transient sub-scan feed.

When these sub-scan feed amounts are used in the second and the third recording modes, it is highly possible that an immediate shift from the second recording mode to the third recording mode prevents the record execution area from being expanded to a desired extent. Even in this case, the use of a transient sub-scan feed will attain expansion of the record execution area.

The necessity of the transient sub-scan feed in the third recording mode and an amount of the transient sub-scan feed may be determined according to an amount of a sub-scan feed by which a lower-end element of the plurality of dot forming elements reaches a position on or after a lower end line of the record execution area on the assumption that sub-scan feeds are to be continued in the second recording mode.

This arrangement readily determines the necessity of the transient sub-scan feed and the amount of the transient sub-scan feed.

The necessity of the transient sub-scan feed in the third recording mode and an amount of the transient sub-scan feed may be determined according to a value Vres defined by:

$$Vres=\{(Lp-\Delta L-Ln)\%\Sigma\}$$

where Lp denotes a length of the record execution area in the sub-scanning direction; $\Delta L$ denotes a distance between an upper end of the record execution area and an upper end of an area to be recorded in the second recording mode; Ln denotes a distance between dot forming elements on both ends of the dot recording head; $\Sigma$ denotes a total of sub-scan feeds in one unit cycle of sub-scan feeds in the second recording mode; and an operator "%" denotes an operation of taking a remainder of a division.

The plurality of sub-scan feed patterns prepared for the first recording mode may have an identical constant sub-scan feed amount but different number of sub-scan feeds; the second recording mode may execute sub-scan feeds while repeatedly using a sequence of non-constant feed amounts as one unit cycle; and the function (iv) may include a function of determining the number of sub-scan feeds in the first recording mode such that the predetermined sub-scan feed pattern is applied for the third recording mode.

This arrangement enables the predetermined sub-scan feed pattern to be applied for the lower end recording in the third recording mode. This simplifies the lower end recording even when the sub-scan feed other than the "minute feeding" is applied for the lower end recording.

The number of sub-scan feeds in the first recording mode may be determined such that a positional relationship between the dot recording head at a final recording position in the second recording mode and the lower end of the record execution area is within a predetermined range.

This arrangement enables the number of sub-scan feeds required in the first recording mode to be determined in a relatively simple manner.

The number of sub-scan feeds in the first recording mode may be determined according to a value Vres defined by:

$$Vres=\{(Lp-\Delta L-Ln)\%\Sigma\}.$$

The head drive unit may intermittently drive the plurality of dot forming elements during each main scan in each of the first through third recording modes so that the plurality of dot forming elements are disabled for (s–1) dot positions among every s dots in a main scanning direction where s is an integer greater than 1.

This arrangement ascertains expansion of the record execution area while improving the picture quality.

The present invention is also directed to a method of recording dots on a recording medium with a dot recording head having a plurality of dot forming elements arranged thereon. The method comprises the steps of: (a) driving at least one of the dot recording head and the recording medium to carry out a main scan; (b) driving at least part of the plurality of dot forming elements during the main scan to create dots; and (c) driving at least one of the dot recording head and the recording medium to carry out a sub-scan every time when the main scan is completed. The plurality of dot forming elements form a plurality of dots of an identical color arrayed at a substantially constant pitch in a sub-scanning direction. In this method, (i) dot recording is executed according to a first recording mode in the vicinity of an upper end of a record execution area of the recording medium while repeatedly executing the steps (a) through (c); (ii) dot recording is executed according to a second recording mode in a middle portion of the record execution area while repeatedly executing the steps (a) through (c); (iii) dot recording is executed according to a third recording mode in the vicinity of a lower end of the record execution area, the third recording mode being different from the second recording mode at least in a sub-scan feed amount; and (iv) one of a plurality of sub-scan feed patterns prepared for selected one of the first recording mode and the third recording mode is selected according to a length of the record execution area in the sub-scanning direction such that a predetermined sub-scan feed pattern is used for the other of the first recording mode and the third recording mode irrespective of the length of the record execution area.

Like the dot recording apparatus discussed above, the above method ascertain expansion of the record execution area in the case where an immediate shift from the second recording mode to the third recording mode prevents the record execution area from being expanded to a desired range. According to the apparatus and the method, the sub-scan feed other than the "minute feeding" can be applied for the lower end recording without making the lower end recording too complicated.

These and other objects, features, aspects, and advantages of the present invention will become more apparent from the following detailed description of the preferred embodiments with the accompanying drawings.

BRIEF DESCRIPTION OF THE DRAWINGS

FIGS. 6A and 6B show an arrangement of ink jet nozzles in the ink discharge heads 61 through 64;

FIGS. 7A and 7B show basic conditions of a dot recording scheme when the number of scan repeats s is equal to one;

FIGS. 9A and 9B show a dot recording scheme applied for middle area recording in the embodiment of the present invention;

FIG. 27 shows the positional relationship between the print execution area and the head when the first example of the upper end recording scheme in the second embodiment and the fourth example of the lower end recording scheme shown in FIG. 24 are applied for dot recording;

FIG. 29 shows the recording pattern of the second example of the upper end recording scheme in the second embodiment;

FIG. 31 shows the recording pattern of a first example of the upper end recording scheme in the third embodiment;

FIG. 33 shows the recording pattern of a second example of the upper end recording scheme in the third embodiment;

DESCRIPTION OF THE PREFERRED EMBODIMENT

A. Structure of Apparatus

Figure 1:
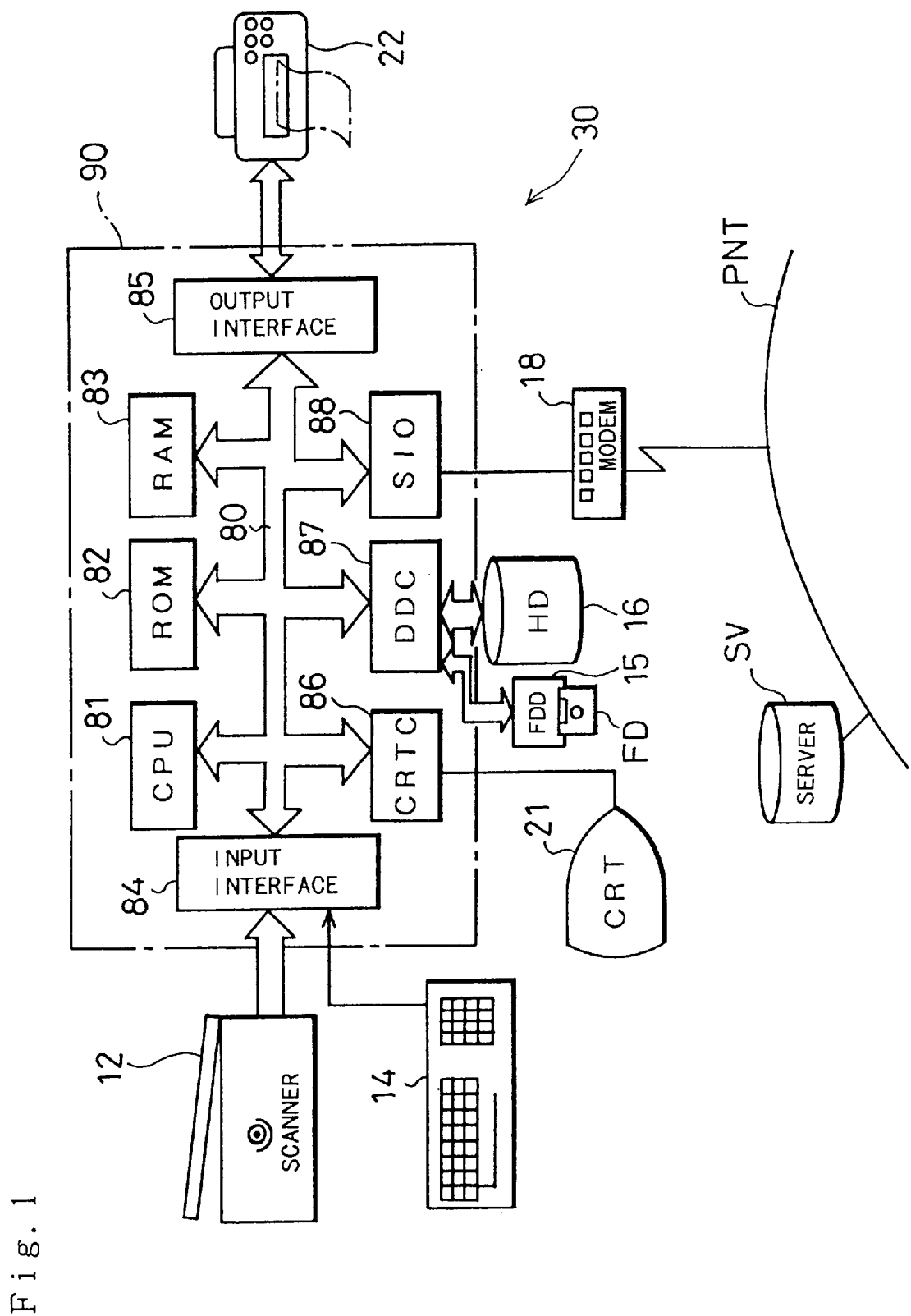
FIG. 1 is a block diagram illustrating the structure of a printing apparatus including a computer 90 as an embodiment according to the present invention.

FIG. 1 is a block diagram illustrating the structure of a printing system as a first embodiment according to the present invention. As illustrated in FIG. 1, the printing system includes a computer 90, to which a scanner 12 and a color printer 22 are connected. The system acts as a printing apparatus when the computer 90 executes computer programs loaded therein. The hardware of the printing system is constructed as a general purpose computer. The computer 90 includes a CPU 81 and other peripheral units mutually connected to one another via a bus 80. The CPU 81 executes a variety of arithmetic and logic operations according to computer programs in order to control operations related to image processing. A ROM 82 stores computer programs and data required for execution of the variety of arithmetic and logic operations by the CPU 81. A RAM 83 is a memory, which temporarily stores various computer programs and data required for execution of the variety of arithmetic and logic operations by the CPU 81. An input interface 84 receives input signals from the scanner 12 and a keyboard 14, whereas an output interface 85 sends output data to the printer 22. A CRT controller (CRTC) 86 controls signal outputs to a CRT 21 that can display color images. A disk drive controller (DDC) 87 controls transmission of data from and to a hard disk 16, a flexible drive 15, and a CD-ROM drive (not shown). The hard disk 16 stores a variety of computer programs that are loaded into the RAM 83 and executed, as well as other computer programs that are supplied in the form of device drivers. A serial input-output interface (SIO) 88 is also connected to the bus 80. The SIO 88 is connected to a public telephone network PNT via a modem 18. The computer 90 is connected with an external network via the SIO 88 and the modem 18, and can access a specific server SV in order to download the computer programs for image processing into the hard disk 16. The computer 90 may alternatively execute the required programs which have been loaded from a flexible disk FD or a CD-ROM.

Figure 2:
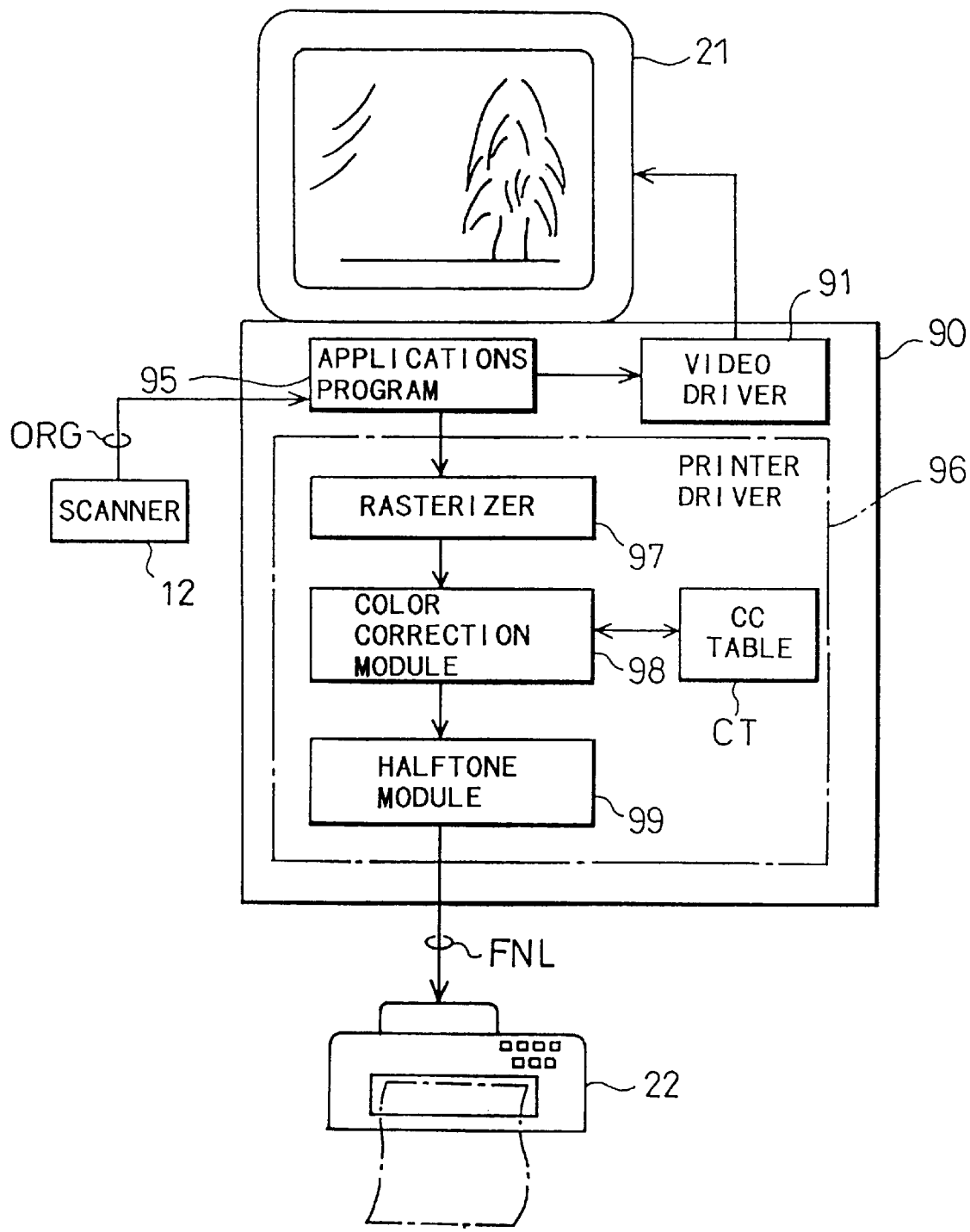
FIG. 2 is a block diagram showing the structure of software relating to the printing process.

FIG. 2 is a block diagram conceptually illustrating the functions of software related to the printing process. In the computer 90, an applications program 95 is activated under a specific operating system. The operating system includes a video driver 91 and a printer driver 96. The printer driver 96 processes image data supplied from the applications program 95 and outputs final color image data FNL to the printer 22. The applications program 95 used to, for example, retouch an image, reads an image from the scanner 12 and executes predetermined processing on the input image, while displaying the image on the CRT display 21 via the video driver 91. When the applications program 95 outputs a printing instruction, the printer driver 96 receives image information from the applications program 95 and converts the input image information to printing signals for the printer 22; the printing signals are binarized signals for the respective colors C, M, Y, and K. In the example of FIG. 2, the printer driver 96 includes a rasterizer 97 for converting the color image data processed by the applications program 95 to dot-based image data, a color correction module 98 for executing color correction on the dot-based image data according to the ink colors C, M, and Y used by the printer 22 and the calorimetric characteristics of the printer 22, a color correction table CT referred to by the color correction module 98, and a halftone module 99 for generating halftone image data, which represents image density by the existence or non-existence of ink in each dot in a specific area, from the color-corrected image data.

Figure 3:
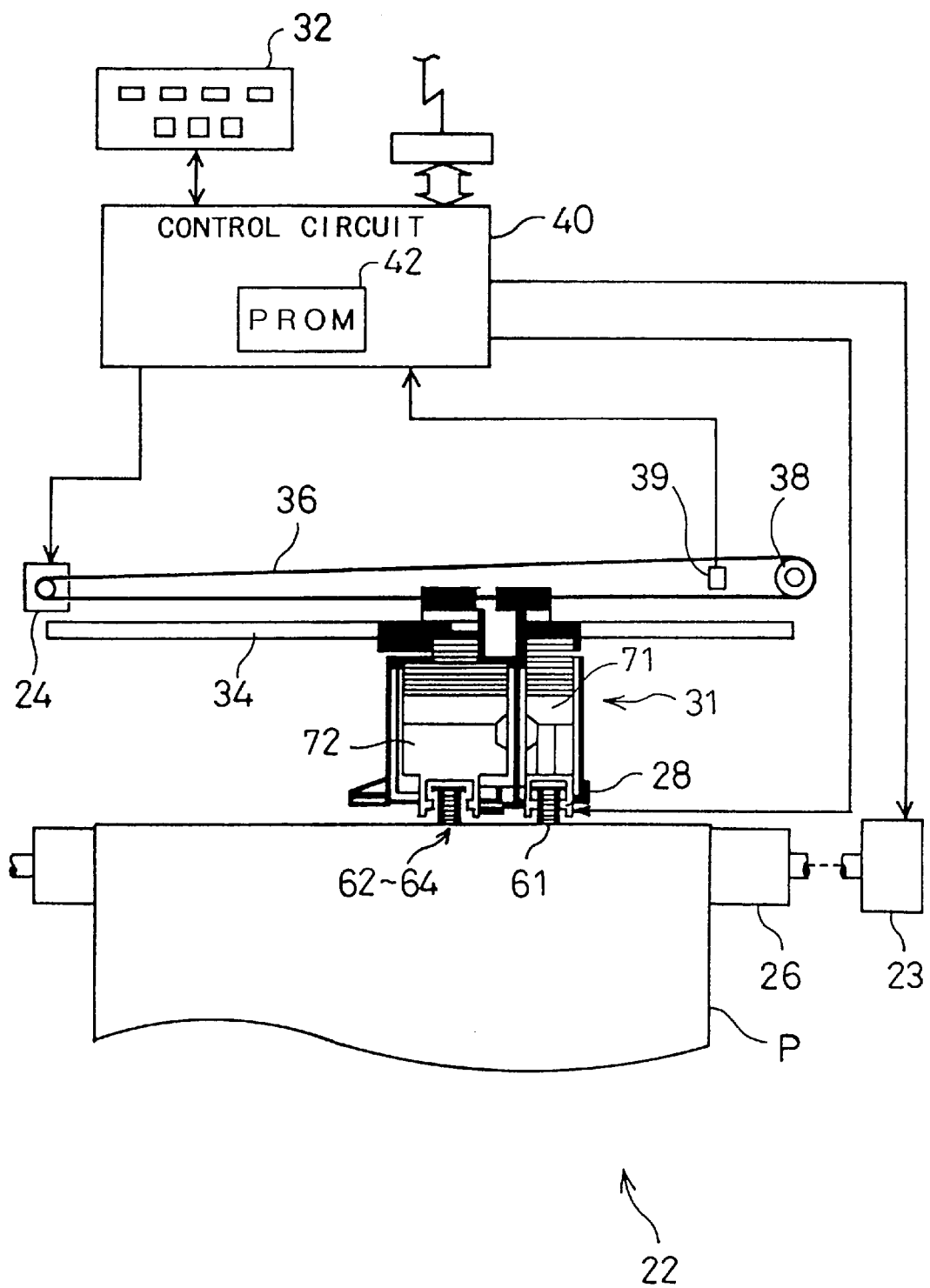
FIG. 3 schematically illustrates the structure of the color printer 22 as an example of the image output unit 20.

FIG. 3 schematically illustrates the structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 4) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 4:
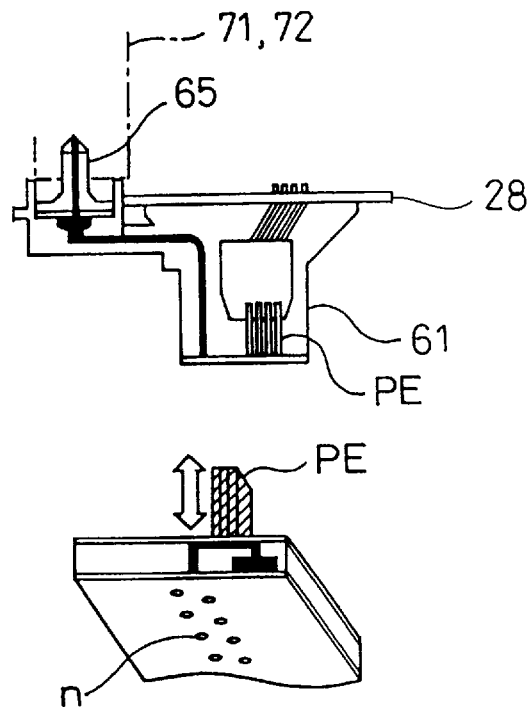
FIG. 4 illustrates the structure of the print head 28.

The following briefly describes the mechanism of discharging ink. When the ink cartridges 71 and 72 are attached to the carriage 31, ink in the ink cartridges 71 and 72 are sucked out through the ink supply conduits 65 by capillarity and are led to the ink discharge heads 61 through 64 formed in the print head 28 arranged in the lower portion of the carriage 31 as shown in FIG. 4. When the ink cartridges 71 and 72 are attached to the carriage 31, a pump works to suck first supplies of ink into the respective ink discharge heads 61 through 64. In this embodiment, the structures of the pump for suction and a cap for covering the print head 28 during the suction are not illustrated nor described specifically.

Figure 5:
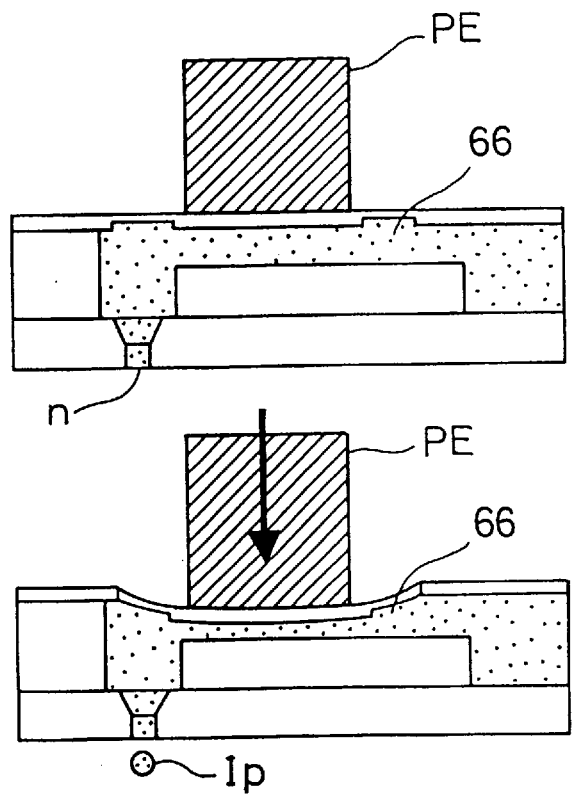
FIG. 5 shows the principle of jetting ink.

An array of thirty-two nozzles "n" is formed in each of the ink discharge heads 61 through 64 as shown in FIG. 4. A piezoelectric element PE, which is one of electrically distorting elements and has an excellent response, is provided for each nozzle "n". FIG. 5 illustrates a configuration of the piezoelectric element PE and the nozzle "n". The piezoelectric element PE is disposed at a position that comes into contact with an ink conduit 66 for leading ink to the nozzle "n". As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 66 as shown in the lower part of FIG. 5. The volume of the ink conduit 66 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware structure discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61 through 64 of the print head 28. The printer 22 accordingly sprays the respective color inks and forms a multi-color image on the printing paper P. Concrete arrangements of the nozzles in the respective ink discharge heads 61 through 64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

The control circuit 40 (see FIG. 3) includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes the dot recording scheme defined by parameters such as the number of actually used nozzles N and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode specification information consists of four-bit data.

When the printer driver 96 (see FIG. 2) is activated in the computer 90, the printer driver 96 reads the dot recording mode information from the PROM 42. In accordance with a concrete procedure, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory. The plural pieces of dot recording mode information may be stored in a storage device other than the PROM 42 or alternatively in the printer driver 96.

FIG. 6 shows an arrangement of ink jet nozzles in the ink discharge heads 61 through 64. The first head 61 has a nozzle array for jetting black ink. Similarly the second through the fourth heads 62 through 64 respectively have nozzle arrays for jetting cyan, magenta, and yellow inks. These four nozzle arrays have identical positions in the sub-scanning direction.

Each of the four nozzle arrays includes thirty-two nozzles n arranged in zigzag with a constant nozzle pitch k in the sub-scanning direction. Thirty-two nozzle n included in each nozzle array may be arranged in alignment, instead of in zigzag. The zigzag arrangement as shown in FIG. 6(A), however, has the advantage of being able to set a smaller nozzle pitch k in the manufacturing process.

Figures 8A, 8B:
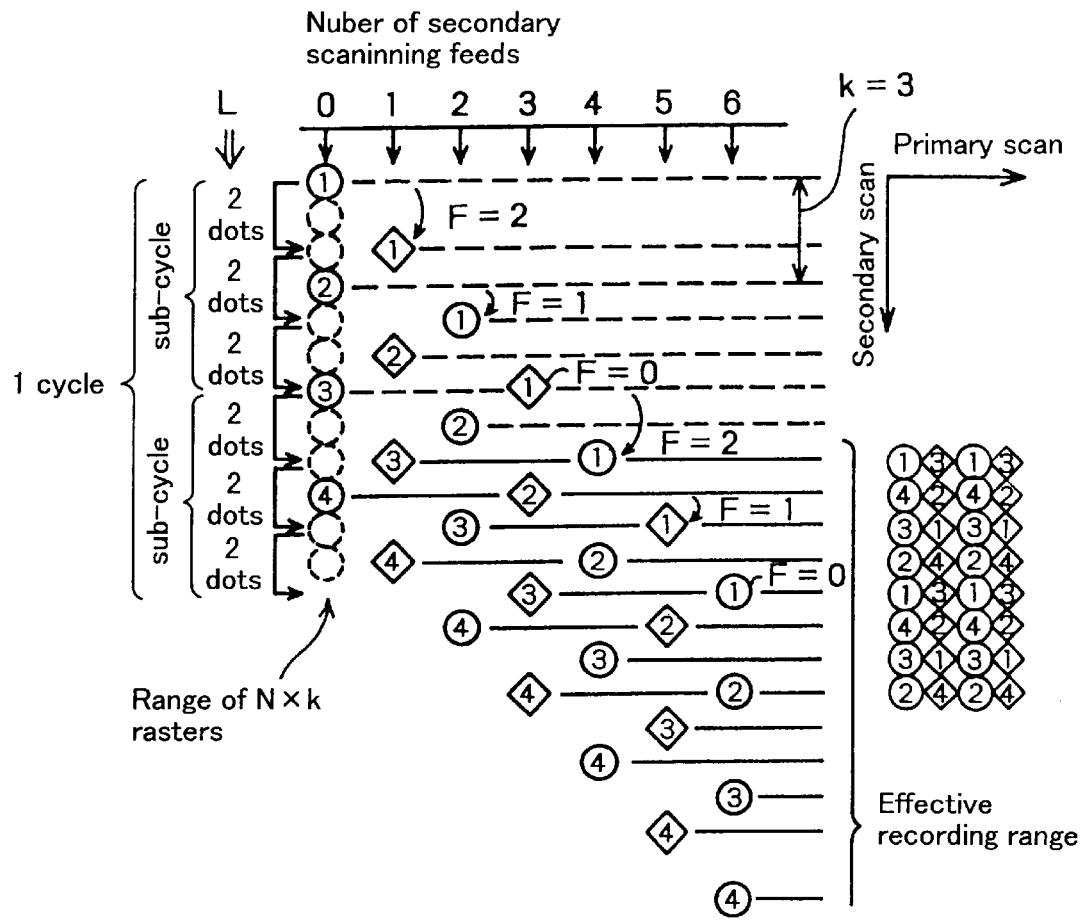
FIGS. 8A and 8B show basic conditions of a dot recording scheme when the number of scan repeats s is equal to two.

FIG. 6(B) shows an arrangement of a plurality of dots formed by one nozzle array. In this embodiment, driving signals are supplied to the piezoelectric elements PE (FIG. 5) of the respective nozzles in order to cause a plurality of dots formed by one nozzle array to be arranged substantially in alignment in the secondary scanning direction, regardless of the arrangement of the ink nozzles; that is, whether the nozzles are arranged in zigzag or in alignment. By way of example, it is assumed that the nozzles are arranged in zigzag as shown in FIG. 8(A) and that the head 61 is scanned rightward in the drawing to form dots. In this case, a group of preceding nozzles 100, 102, . . . receive driving signals at an earlier timing by d/v [second] than a group of following nozzles 101, 103. . . . In the drawing of FIG. 8(A), d [inch] denotes the pitch between the two nozzle groups in the head 61, and v [inch/second] denotes the scanning speed of the head 61. A plurality of dots formed by one nozzle array are accordingly arranged in alignment in the secondary scanning direction. As described later, all the thirty-two nozzles provided in each of the heads 61 through 64 are not always used, but only part of the nozzles may be used according to the dot recording scheme.

The nozzle arrays 61–64 of FIG. 6 correspond to the dot forming element array in the present invention. The carriage feed mechanism including the carriage motor 24 shown in FIG. 3 corresponds to the main scan drive unit and the sheet feed mechanism including the sheet feed motor 23 corresponds to the sub-scan drive unit. The circuitry including the piezoelectric elements for the nozzles correspond to the head drive unit. The control circuit 40 and the printer driver 96 (FIG. 2) as a whole correspond to the controller of the present invention.

B. Basic Conditions of Middle Area Recording Scheme

Prior to the description of the dot recording schemes for the upper and lower end recording and the middle area recording in the embodiment of the present invention, the following describes basic conditions required for the middle area recording scheme. The following basic conditions are not essentially adopted for the upper end recording scheme and the lower end recording scheme, but is applicable for the upper end recording scheme and the lower end recording scheme.

Figure 7A:
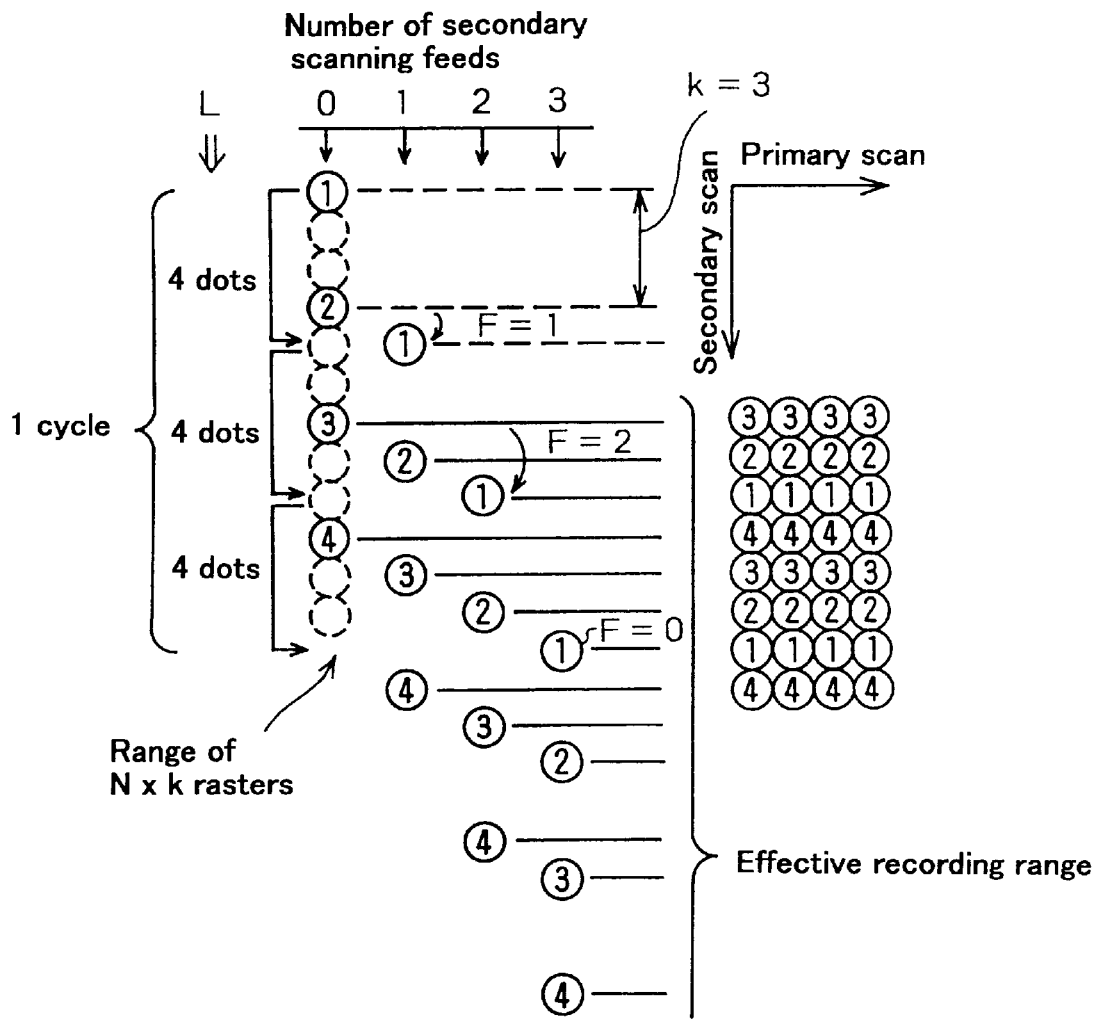

FIGS. 7(A) and 7(B) show basic conditions of a general dot recording scheme when the number of scan repeats s is equal to one. FIG. 7(A) illustrates an example of sub-scan feeds with five nozzles, and FIG. 7(B) shows parameters of the dot recording scheme. In the drawing of FIG. 7(A), solid circles including numerals indicate the positions of the five nozzles in the sub-scanning direction after each sub-scan feed. The encircled numerals 0 through 4 denote the nozzle numbers. The five nozzles are shifted in the sub-scanning direction every time when one main scan is concluded. Actually, however, the sub-scan feed is realized by feeding a printing paper with the sheet feed motor 23.

As shown on the left-hand side of FIG. 7(A), the sub-scan feed amount L is fixed to five dots. On every sub-scan feed, the five nozzles are shifted by five dots in the sub-scanning direction. When the number of scan repeats s is equal to one, each nozzle can record all dots (pixels) on the raster line. The right-hand side of FIG. 7(A) shows the nozzle numbers of the nozzles which record dots on the respective raster lines.

When the recording mode shown in FIGS. 7(A) and 7(B) is adopted from the top of the printing paper without the upper end recording scheme discussed later, there are some non-recordable raster lines above or below those raster lines that are drawn by the broken line extending rightward (in the main scanning direction) from a circle representing the position of the nozzle in the sub-scanning direction. Recording of dots is thus prohibited on these raster lines drawn by the broken line. On the contrary, both the raster lines above and below a raster line that is drawn by the solid line extending in the main scanning direction are recordable with dots. The range in which dots can be recorded is hereinafter referred to as the "printable area" (or the "recordable area"). The range in which the dot recording is actually executed is referred to as the "print execution area" (or the "record execution area"). The print execution area may be set narrower than or the same with the printable area. The printable area is expanded by the upper end recording scheme or the lower end recording scheme described later. The range other than the printable area on the printing paper is referred to as the "unprintable area" (or the "unrecordable area"). The range other than the print execution area on the printing paper is referred to as the "non-print area" (or the "non-recorded area"). All the area which is scanned with the nozzles (including both the print execution area and the non-print area) is referred to as the nozzle scan area.

Various parameters related to the dot recording scheme are shown in FIG. 7(B). The parameters of the dot recording scheme include the nozzle pitch k [dots], the number of used nozzles N, the number of scan repeats s, number of effective nozzles Neff, and the sub-scan feed amount L [dots].

In the example of FIGS. 7(A) and 7(B), the nozzle pitch k is 4 dots, and the number of used nozzles N is 5. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster. In the case of FIGS. 7(A) and 7(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 7(B) shows the sub-scan feed amount L, its accumulated value $\Sigma L$, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 7(A)). For example, as shown in FIG. 7(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 7(A)). Similarly, the position of the nozzles after the second sub-scan feed is $\Sigma L(=8)$ dots away from the initial position so that the offset F is 2. The position of the nozzles after the third sub-scan feed is $\Sigma L(=12)$ dots away from the initial position so that the offset F is 0. Since the third sub-scan feed brings the nozzle offset F back to zero, all dots of the raster lines within the printable area can be serviced by repeating the cycle of 3 sub-scans.

As will be understood from the above example, when the nozzle position is apart from the initial position by an integral multiple of the nozzle pitch k, the offset F is zero. The offset F is given by $(\Sigma L)\%k$, where $\Sigma L$ is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the printable area:

Condition C1: The number of sub-scan feeds in one feed cycle is equal to the nozzle pitch k.

Condition C2: The nozzle offsets F after the respective sub-scan feeds in one feed cycle assume different values in the range of 0 to (k−1).

Condition C3: Average sub-scan feed amount ($\Sigma L/k$) is equal to the number of used nozzles N. In other words, the accumulated value $\Sigma L$ of the sub-scan feed amount L for the whole feed cycle is equal to a product (N×k) of the number of used nozzles N and the nozzle pitch k.

The above conditions can be understood from the following reasons. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition C1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition C2 is accordingly required.

When the first and the second conditions C1 and C2 are satisfied, each of the N nozzles records k raster lines in one feed cycle. Namely N×k raster lines can be recorded in one feed cycle. When the third condition C3 is satisfied, the nozzle position after one feed cycle (that is, after the k sub-scan feeds) is away from the initial position by the N×k raster lines as shown in FIG. 7(A). Satisfying the above first through the third conditions C1 to C3 thus prevents skipping or overwriting of raster lines to be recorded in the range of N×k raster lines.

FIGS. 8(A) and 8(B) show the basic conditions of a general dot recording scheme if the number of scan repeats s is 2 or greater. When the number of scan repeats s is 2 or greater, each raster line is recorded with s different nozzles. In the description hereinafter, the dot recording scheme adopted when the number of scan repeats s is not less than 2 is referred to as the "overlap scheme".

The dot recording scheme shown in FIGS. 8(A) and 8(B) amounts to that obtained by changing the number of scan repeats s and the sub-scan feed amount L among the dot recording scheme parameters shown in FIG. 7(B). As will be understood from FIG. 8(A), the sub-scan feed amount L in the dot recording scheme of FIGS. 8(A) and 8(B) is a constant value of two dots. In FIG. 8(A), the nozzle positions after the odd-numbered sub-scan feeds are indicated by the diamonds. As shown on the right-hand side of FIG. 8(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the printable area is intermittently recorded on every other dot by the No. 3 nozzle after the first sub-scan feed and then intermittently recorded on every other dot by the No. 1 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 8(A). In one possible scheme, dot recording is executed at the positions indicated by the circles shown in the right-hand side of FIG. 8(A) after the first sub-scan feed, and is executed at the shifted positions indicated by the diamonds after the fourth sub-scan feed.

The lower-most row of the table of FIG. 17(B) shows the values of the offset F after each sub-scan feed in one feed cycle. One feed cycle includes six sub-scan feeds. The offsets F after each of the six sub-scan feeds assume each value between 0 and 2, twice. The variation in the offset F after the first through the third sub-scan feeds is identical with that after the fourth through the sixth sub-scan feeds. As shown on the left-hand side of FIG. 8(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is 2 or greater, the sub-cycle of the sub-scan feed may be referred to as the "unit cycle" which is repeatedly applied in dot recording. In the same sense, when the number of scan repeats s is 1, the one feed cycle may be referred to as the "unit cycle".

When the number of scan repeats s is an integer of not less than 2, the first through the third conditions C1 to C3 discussed above are rewritten into the following conditions C1' through C3':

Condition C1': The number of sub-scan feeds in one feed cycle is equal to a product (k×s) of the nozzle pitch k and the number of scan repeats s.

Condition C2': The nozzle offsets F after the respective sub-scan feeds in one feed cycle assume each value between 0 to (k−1), s times.

Condition C3': Average sub-scan feed amount $\{\Sigma L/k \times s)\}$ is equal to the number of effective nozzles Neff (=N/s). In other words, the accumulated value $\Sigma L$ of the sub-scan feed amount L for the whole feed cycle is equal to a product $\{Neff \times (k \times s)\}$ of the number of effective nozzles Neff and the number of sub-scan feeds (k×s).

The above conditions C1' through C3' hold even when the number of scan repeats s is one. This means that the conditions C1' through C3' generally hold for the dot recording scheme irrespective of the number of scan repeats s. When these three conditions C1' through C3' are satisfied, there is no skipping or overwriting of dots recorded in the printable area. If the overlap scheme is applied (if the number of scan repeats s is not less than 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions C1' through C3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

C. Example of Middle Area Recording Scheme

Figure 9A:
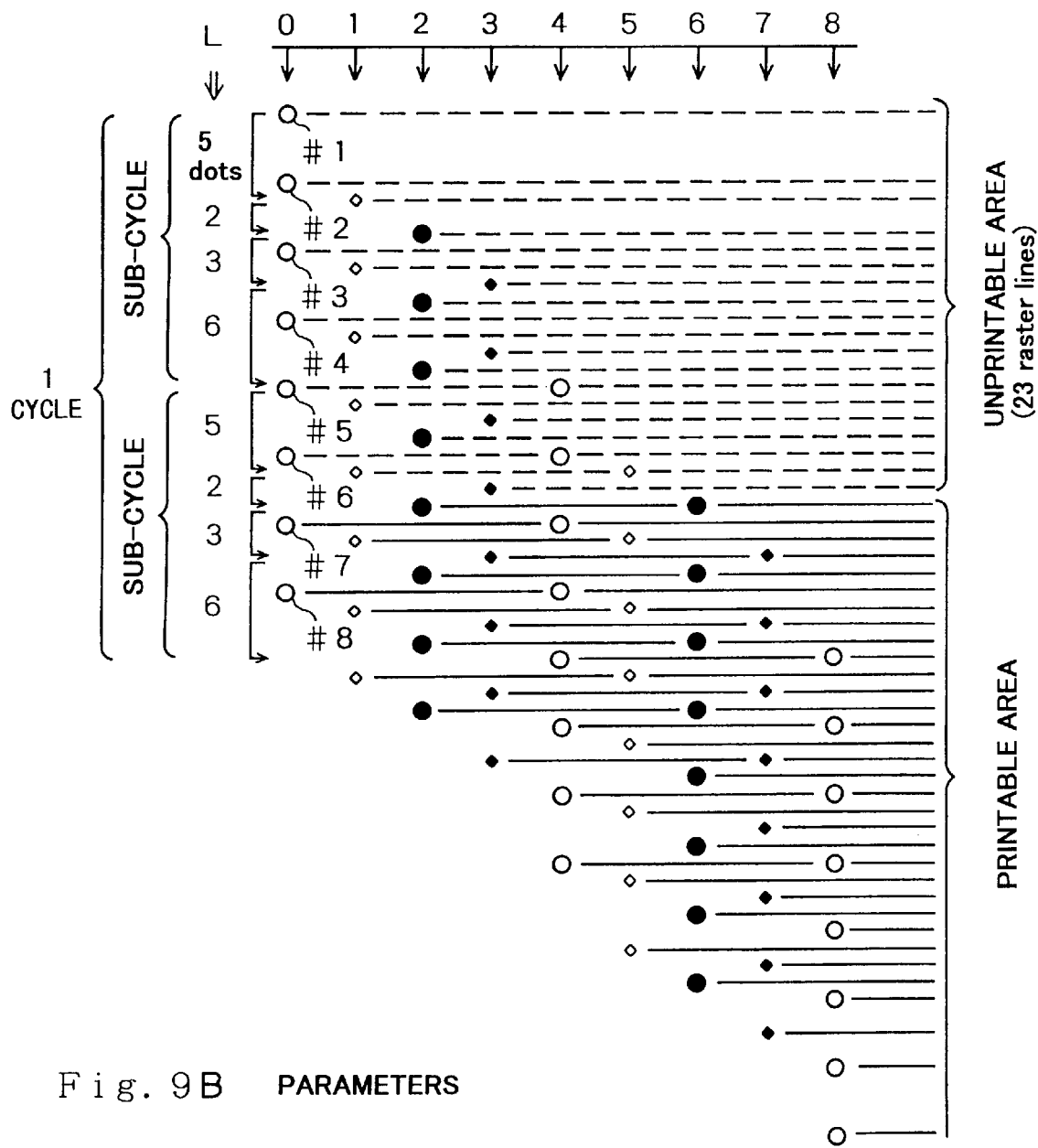

FIGS. 9(A) and 9(B) show a dot recording scheme applied for the middle area recording in the embodiment of the present invention. As shown in FIG. 9(B), the scan parameters of this scheme are as follows: the nozzle pitch k is 4 dots, the number of actually-used nozzles N is 8, the number of scan repeats s is 2, and the number of effective nozzles Neff is 4.

In the example of FIG. 9(A), the nozzle numbers #1 through #8 are sequentially assigned to the eight nozzles actually used. In the dot recording scheme applied for the middle area recording, four sub-scan feeds constitute one sub-cycle, and two sub-cycles constitute one feed cycle. The sequence of the sub-scan feed amounts L in each sub-cycle is 5, 2, 3, and 6 dots. Namely a plurality of different values are used as the sub-scan feed amounts L. The positions of the eight nozzles after each sub-scan feed are indicated by four different symbols, respectively. The sub-scan feed scheme that utilizes a combination of a plurality of different feed amounts like this embodiment is referred to as the "irregular feeding".

When the upper end recording scheme discussed later is not performed, the unprintable area of 23 raster lines is present before the printable area. This means that the printable area starts from the 24-th raster line, which is counted from the upper end of the nozzle scan area (the area including both the printable area and the unprintable area).

The table of FIG. 9(B) shows the amount of each sub-scan feed L, the accumulated value ΣL thereof, and the nozzle offset F after each sub-scan feed. The parameters shown in FIG. 9(B) satisfy the three conditions C1' through C3' discussed above: the number of sub-scan feeds in one feed cycle is equal to a product (k×s=8) of the nozzle pitch k(=4) and the number of scan repeats s(=2) (first condition C1'); the nozzle offset F after each sub-scan feed in one feed cycle is between 0 and (k−1), that is, between 0 and 3 (second condition C2'); the average sub-scan feed amount (ΣL/k) is equal to the number of effective nozzles Neff (=4) (third condition C3'). The dot recording scheme adopted for the middle area recording accordingly satisfies the basic requirement that there is no skipping or overwriting of raster lines recorded in the printable area.

The dot recording scheme adopted for the middle area recording has two features described below. The first feature is that the nozzle pitch k and the number of actually-used nozzles N are integers of not less than 2 and they are not relatively prime. Two integers are the to be "relatively prime" if they have no common denominator other than 1. The second feature is that a plurality of different values are used as the sub-scan feed amounts L. In many of the conventional dot recording schemes, the number of nozzles N and the nozzle pitch k are set to be relatively prime integers. Even when a large number of nozzles are provided, the number of actually-used nozzles N is restricted to the values that are relatively prime to the nozzle pitch k. In other words, the conventional techniques has a problem that the nozzles provided are not sufficiently utilized. The dot recording scheme having the first feature that the nozzle pitch k and the number of actually-used nozzles N are integers of not less than 2 that are not relatively prime, on the other hand, can enhance the utilization ratio of the nozzles provided. The second feature ascertains the basic requirement that there is no skipping or overwriting of raster lines recorded in the printable area even when the scheme has the first feature. The dot recording scheme that has the first feature but uses a constant sub-scan feed amount L causes skipping or overwriting of raster lines.

The irregular feeding scheme that does not have the first feature may be applied for the dot recording scheme of the middle area recording. In this case, relatively prime integers are set to the nozzle pitch k and the number of actually-used nozzles N.

Figure 10:
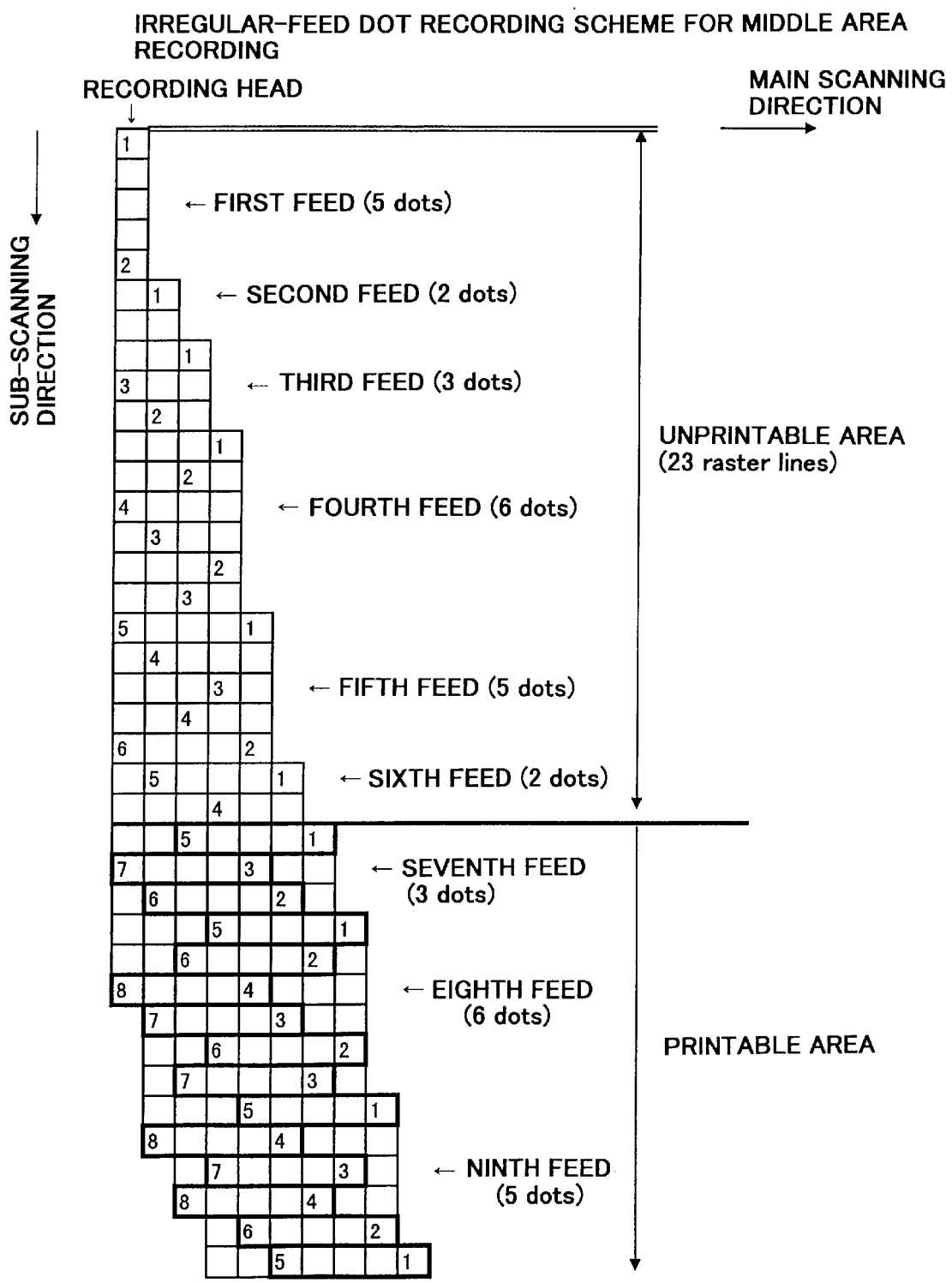
FIG. 10 shows nozzles used to record each raster line in the middle area recording.

FIG. 10 shows which nozzles are used to record each raster line in the irregular feeding dot recording scheme shown in FIG. 9(A). The numerals 1 through 8 in the small square frames indicate the nozzle numbers. In the printable area, each raster line along the main scanning direction is recorded by two nozzles. By way of example, the raster line on the upper-most end of the printable area is recorded by the fifth nozzle and the first nozzle. The fifth nozzle records, for example, even-address pixels on the line, whereas the first nozzle records odd-address pixels.

Figure 11B:
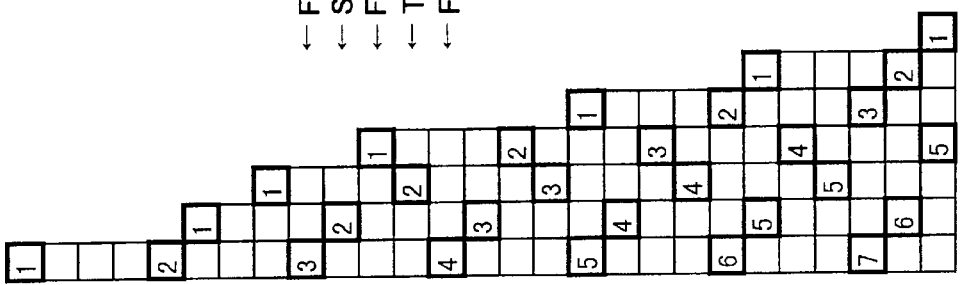
FIGS. 11A and 11B show regular sub-scan feed and irregular sub-scan feed.
Figure 11A:
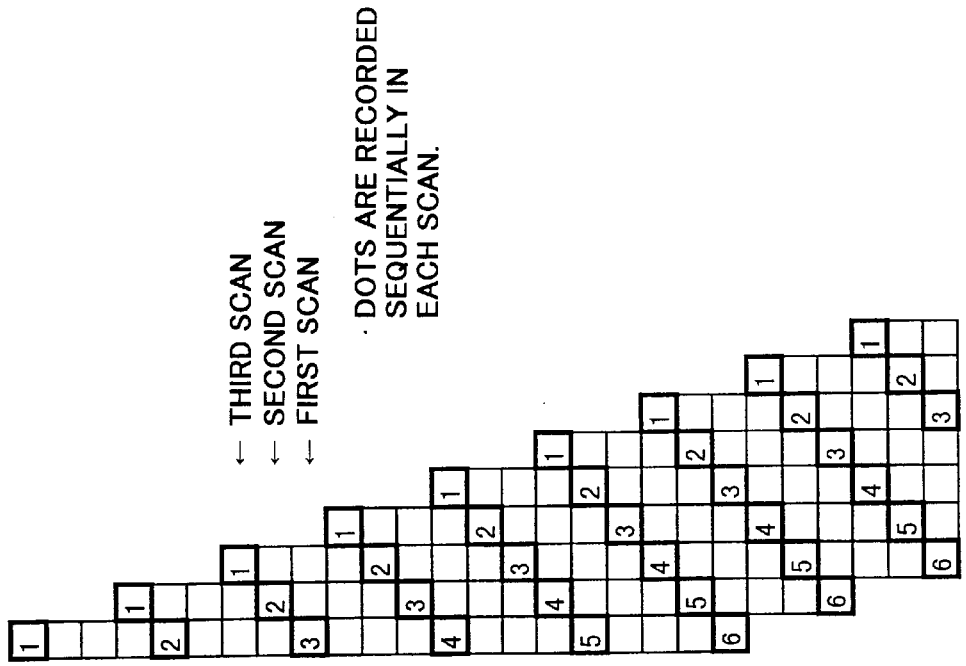

FIGS. 11(A) and 11(B) show constant sub-scan feeds and irregular sub-scan feeds. In FIGS. 11(A) and 11(B), the arrow captioned "first scan" indicates the raster line recorded by the first main scan and the arrow captioned "second scan" indicates the raster line recorded by the second main scan after the first sub-scan. When the sub-scan feed amount is constant like the example of FIG. 11(A), each raster line under recording in the current main scan is adjacent to a raster line recorded in the previous main scan. In the irregular sub-scan feeds like the example of FIG. 11(B), on the contrary, some raster lines under recording in the current main scan may not be adjacent to any raster lines recorded in the previous main scan: see, for example, the third scan. The following two problems may arise when the adjacent raster lines are always the target of recording in the subsequent scan as in the example of FIG. 11(A). The first problem is that blotting is often observed between adjacent dots. The second problem is that accumulation of the mechanical sub-scan feed errors causes a significant positional misalignment between two adjacent raster lines. These two problems deteriorates picture quality. The irregular feeding scheme avoids these problems and thereby improves the picture quality.

The dot recording scheme using a constant sub-scan feed may be applied for the middle area recording, but the irregular feeding scheme is preferable in terms of picture quality.

The first through third embodiments described below are classified into two groups. The first embodiment uses only one specific sub-scan feed pattern for the upper end recording scheme and selects one of a plurality of sub-scan feed patterns for the lower end recording scheme. The first embodiment is referred to as the "embodiment using adjustment by the lower end recording scheme". Unlike the first embodiment, the second and the third embodiments use only one specific sub-scan feed pattern for the lower end recording scheme and select one of a plurality of sub-scan feed patterns for the upper end recording scheme. The second and the third embodiments are referred to as the "embodiment using adjustment by the upper end recording scheme". The following successively describes these three embodiments.

D. First Embodiment (Lower end recording scheme)

Figure 12:
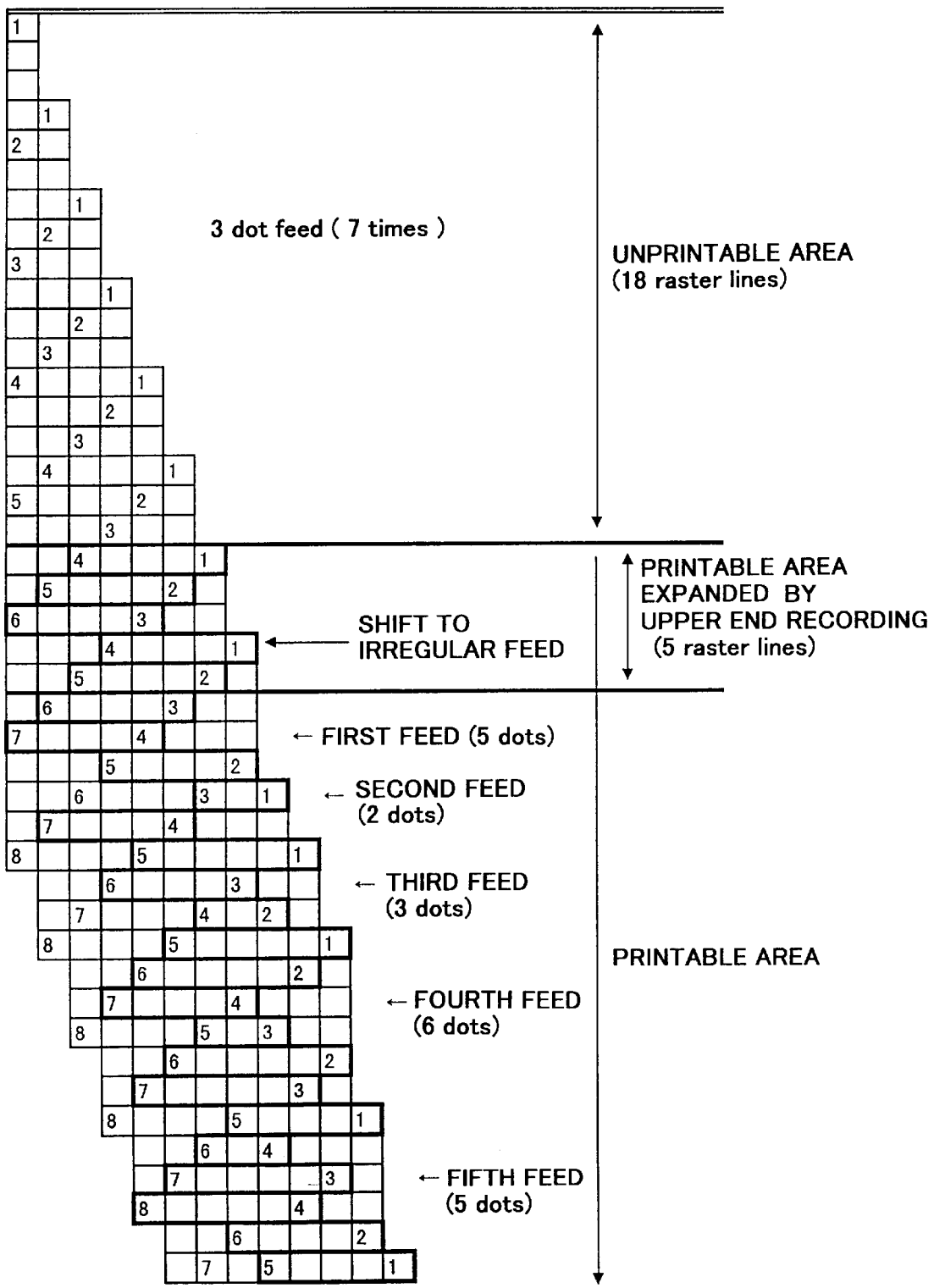
FIG. 12 shows an example of the upper end recording scheme applied when the adjustment by the lower end recording scheme is carried out.

D-1. Example of the Upper End Recording Scheme When a Lower End Recording Scheme is Applied FIG. 12 shows an example of the upper end recording scheme when the lower end recording scheme is applied. In this upper end recording scheme, 3-dot sub-scan feed is repeated seven times prior to the irregular feedings in the middle area recording scheme. Like the middle area recording scheme, the number of scan repeats is 2 in the upper end recording scheme, so that each raster line is recorded by two main scans. The upper end recording scheme reduces the unprintable area from 23 raster lines (see FIG. 10) to 18 raster lines (see FIG. 12) and thereby expanding the printable area by five raster lines.

In the upper end dot recording scheme, recordable raster lines and recordable dots may be overlapped, and the above conditions C1' through C3' are not necessarily satisfied. The dot recording scheme of the upper end recording shown in FIG. 12 actually does not satisfy these conditions.

In the upper end recording, the one-dot minute feed may be applied, and the number of scan repeats may be 1. For the improvement in picture quality, however, it is preferable to set the sub-scan feed amount equal to a plurality of dots and set the identical number of scan repeats for both the upper end recording scheme and the middle area recording scheme. The upper end recording scheme is not essential, and the dot recording mode that is adopted for the middle area recording may be used from the upper end of the printable area.

Figure 13:
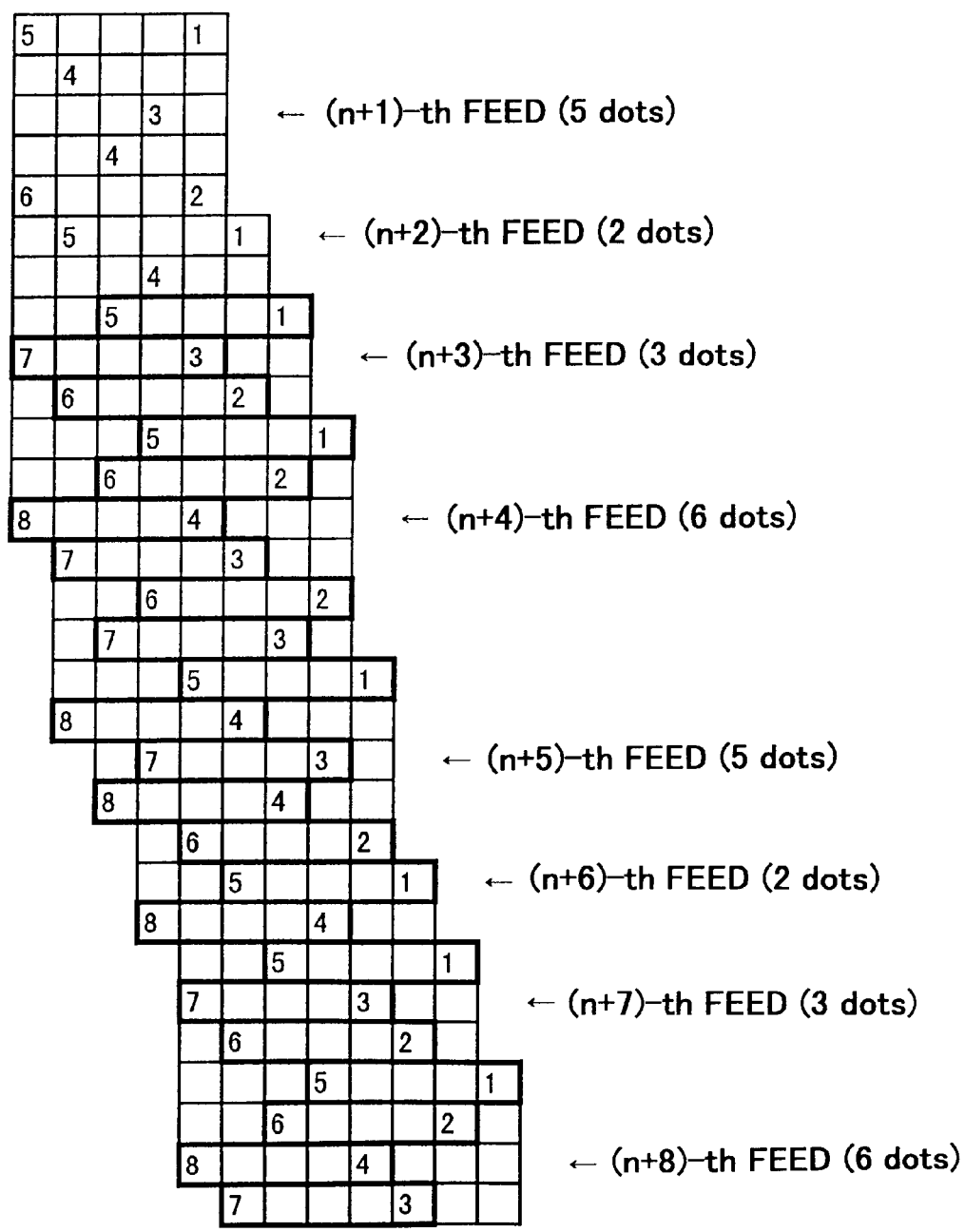
FIGS. 13 and 14 show dot recording without the lower end recording scheme.
Figure 14:
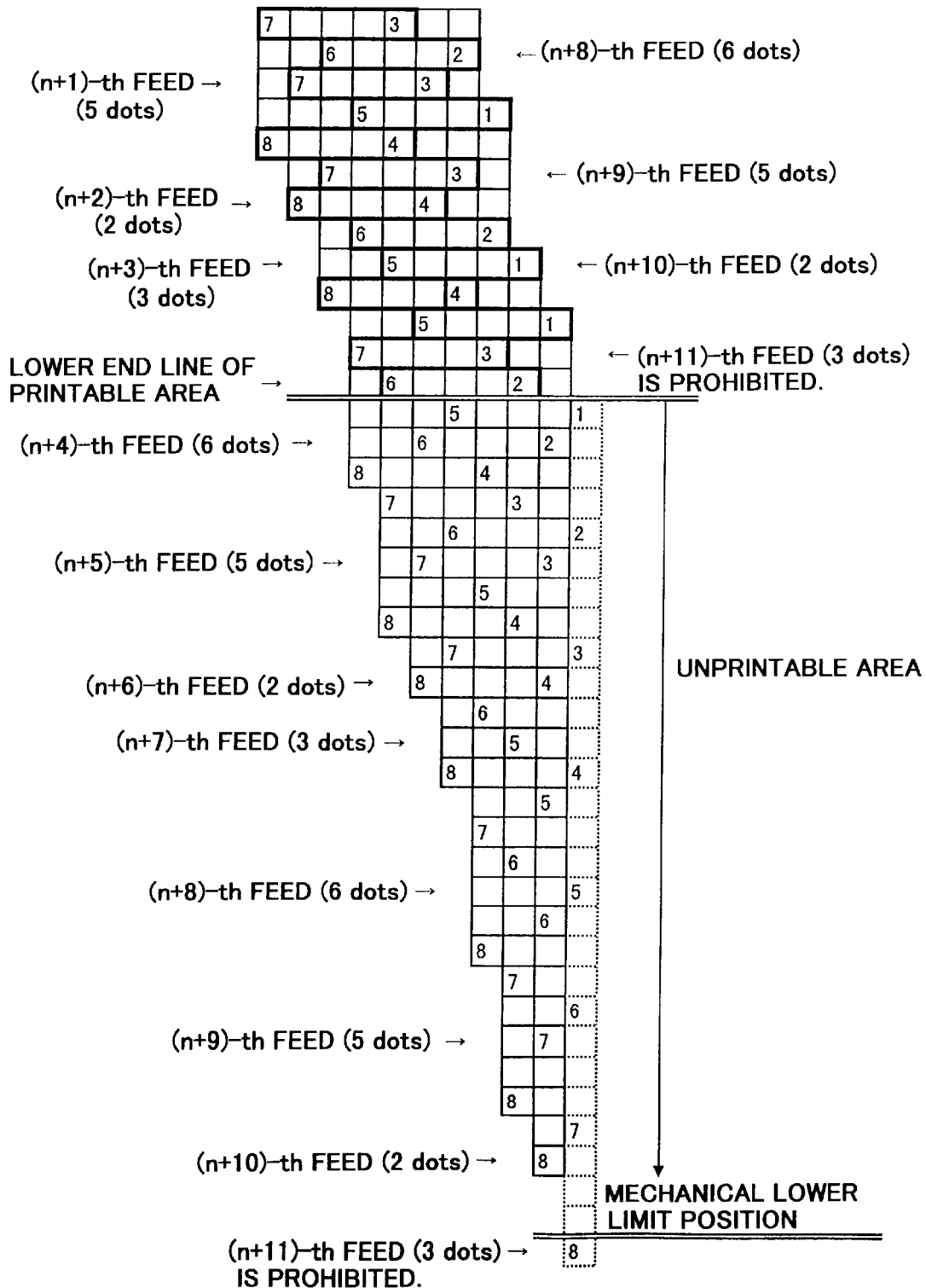

D-2. Examples of Printable Area Adjustment by the Lower End Recording Scheme FIGS. 13 and 14 show the dot recording in the vicinity of the lower end of the printable area without using the lower end recording scheme. FIG. 14 shows the raster lines following those of FIG. 13, and the lower end raster line in FIG. 13 is identical with the upper end raster line in FIG. 14. This arrangement is adopted for the other drawings described later. In the drawings of FIGS. 13 and 14, the "(n+1)-th feed" indicates the (n+1)-th sub-scan in the middle area recording scheme. This means that the sub-scan feed has been carried out n times before the state of FIGS. 13 and 14, where the value n is not specifically important.

As shown in FIG. 14, there is a mechanical lower limit position, which does not mechanically allow any further feed, in the vicinity of the lower end of the sheet. The eighth nozzle on the lower end of the print head (FIG. 9) can not go beyond this mechanical lower limit position. If the (n+11)-th sub-scan feed of three dots were carried out, the eighth nozzle on the lower end would be moved below the mechanical lower limit position as shown by the broken line in FIG. 14. The actual limit of the sub-scan feed is accordingly the (n+10)-th feed. In the scanning process up to the (n+10)-th sub-scan feed, the line immediately below the "lower end line of the printable area" is serviced during only one main scan with the nozzle #5. Since this line is not scanned twice, it is within the unprintable area.

Figure 15:
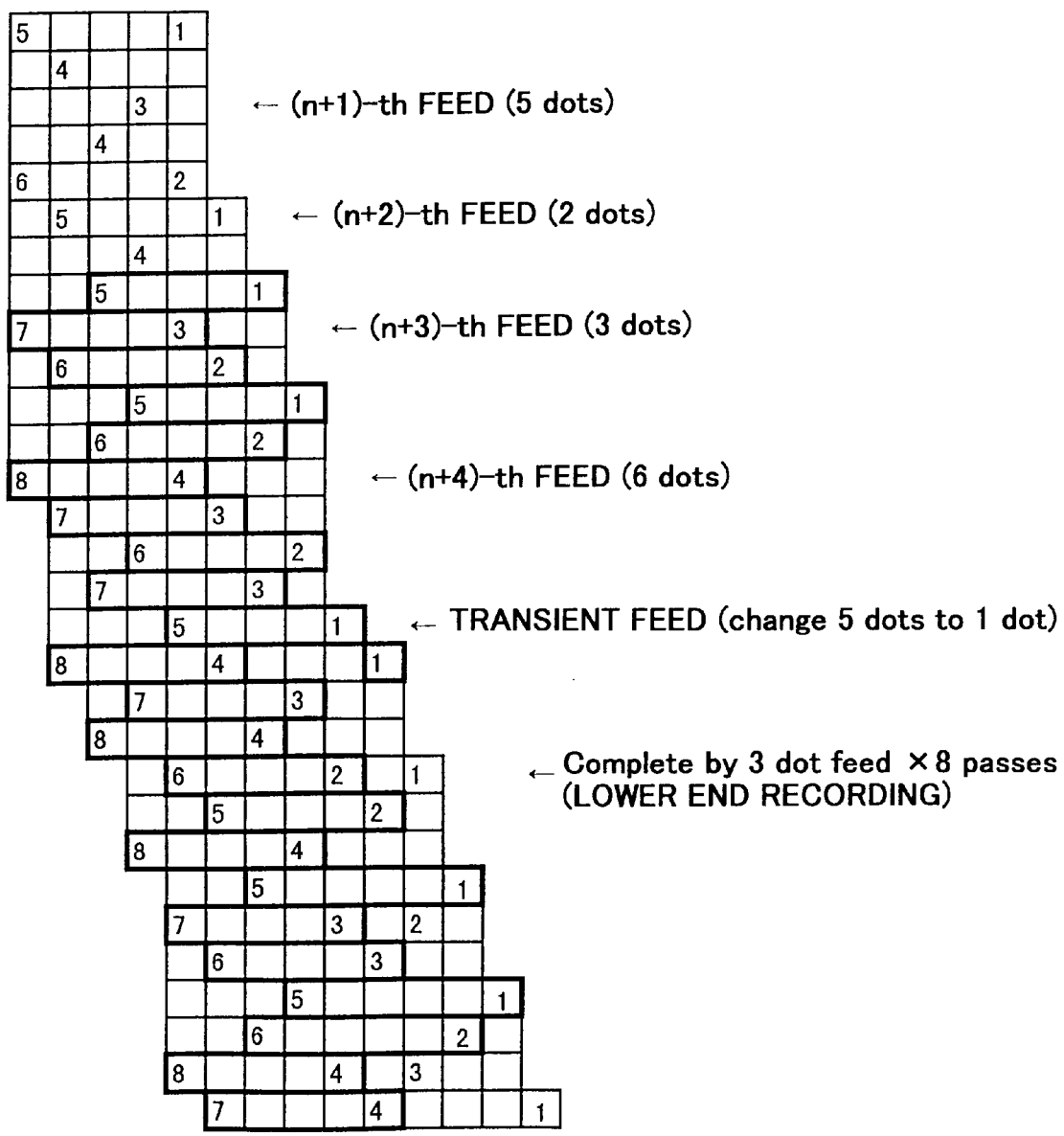
FIGS. 15 and 16 show dot recording with the lower end recording scheme.
Figure 16:
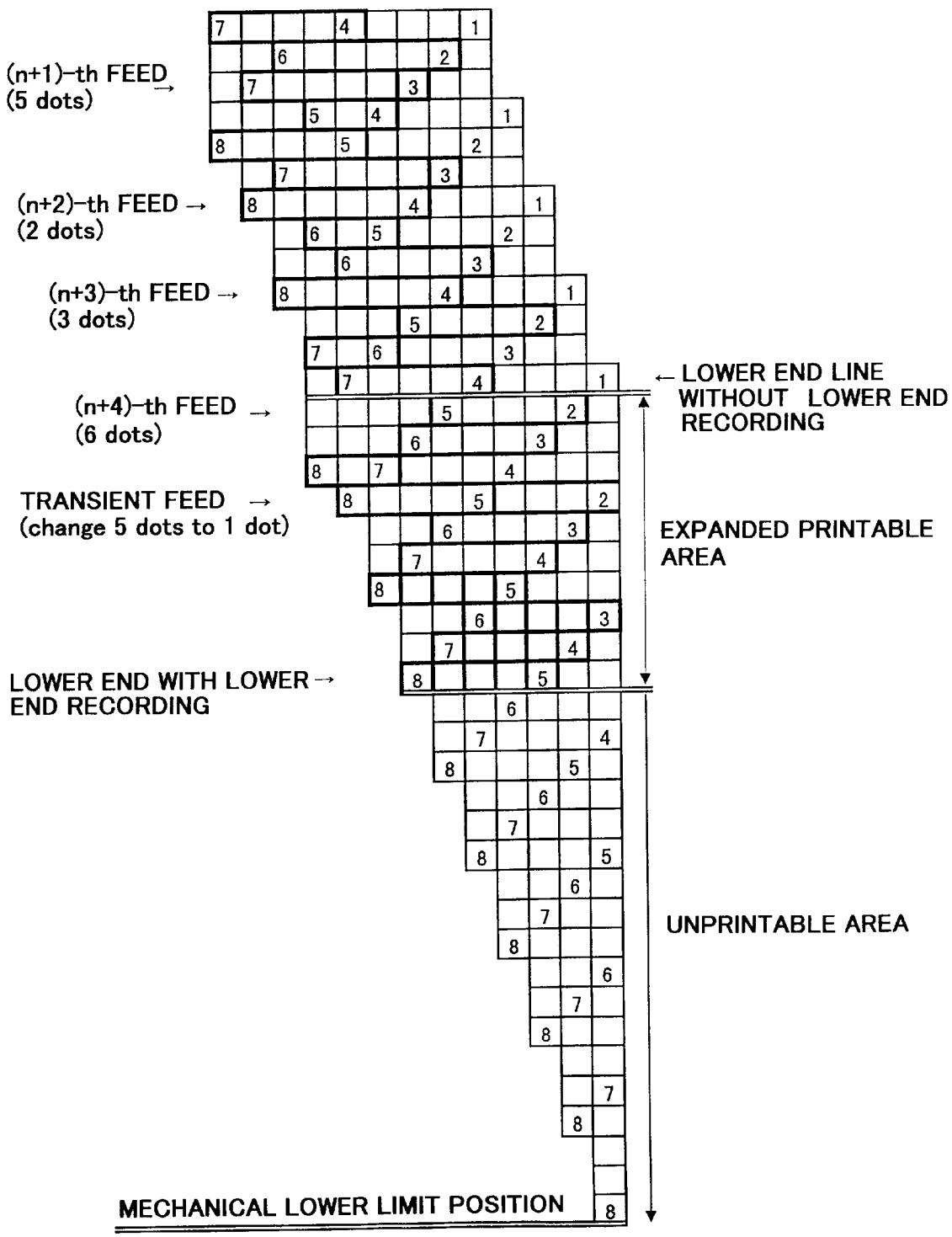

FIGS. 15 and 16 show the dot recording in the vicinity of the lower end of the printable area using the lower end recording scheme. The scanning process of FIGS. 15 and 16 up to the (n+4)-th sub-scan feed is identical with that of FIGS. 13 and 14 without the lower end recording scheme. In the example of FIGS. 15 and 16, the (n+5)-th sub-scan feed of five dots is changed to a transient feed of one dot, and 3-dot sub-scan feed is repeated eight times after the transient feed. This expands the lower end of the printable area by 10 raster lines as shown in FIG. 16.

Since overlapping of recordable raster lines and recordable dots is allowed for the lower end dot recording scheme, the conditions C1' through C3' are not necessarily satisfied. The lower end dot recording scheme shown in FIGS. 15 and 16 actually does not satisfy these conditions.

Figure 17:
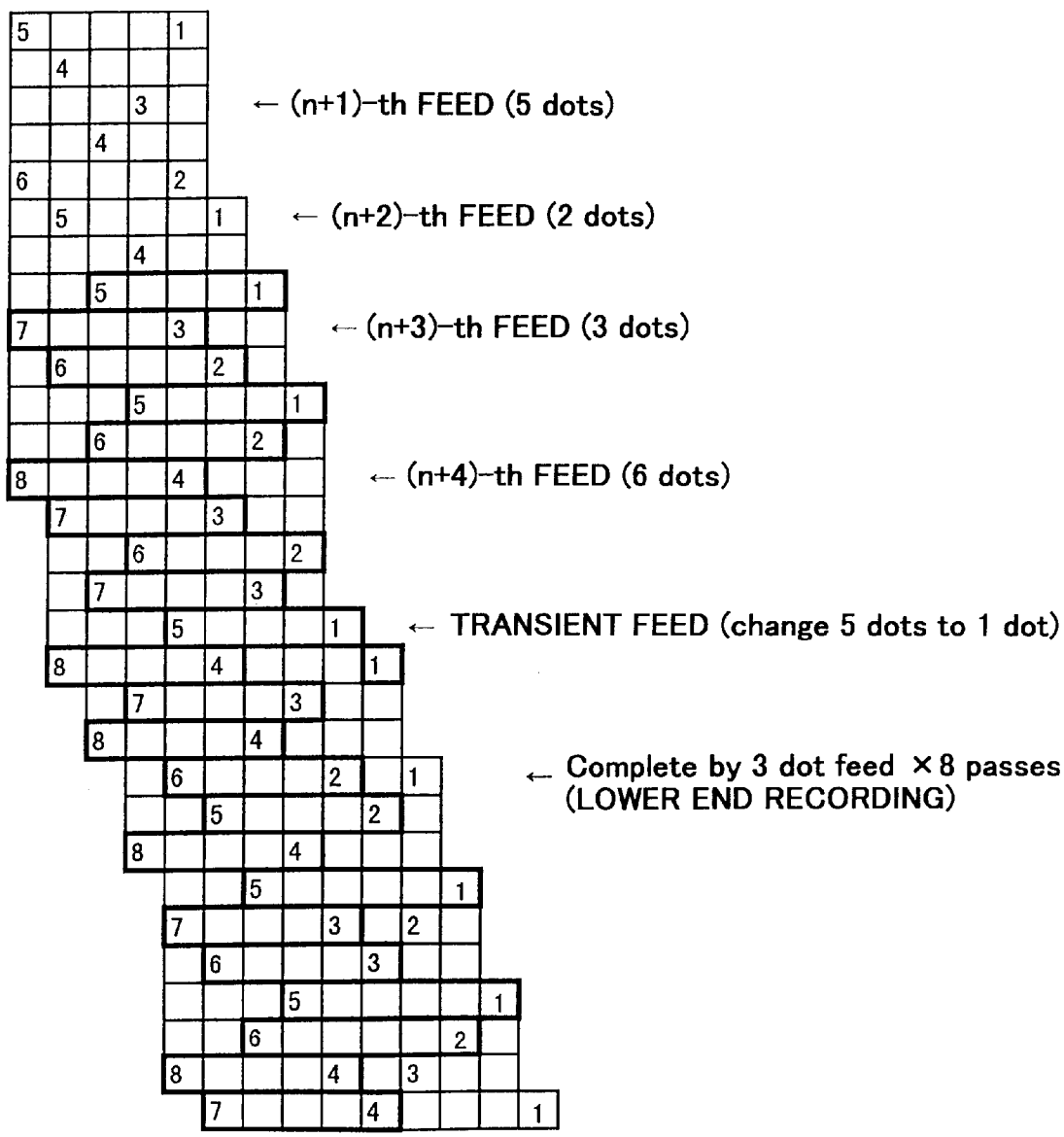
FIGS. 17 and 18 show a first example of the lower end recording scheme in a first embodiment.
Figure 18:
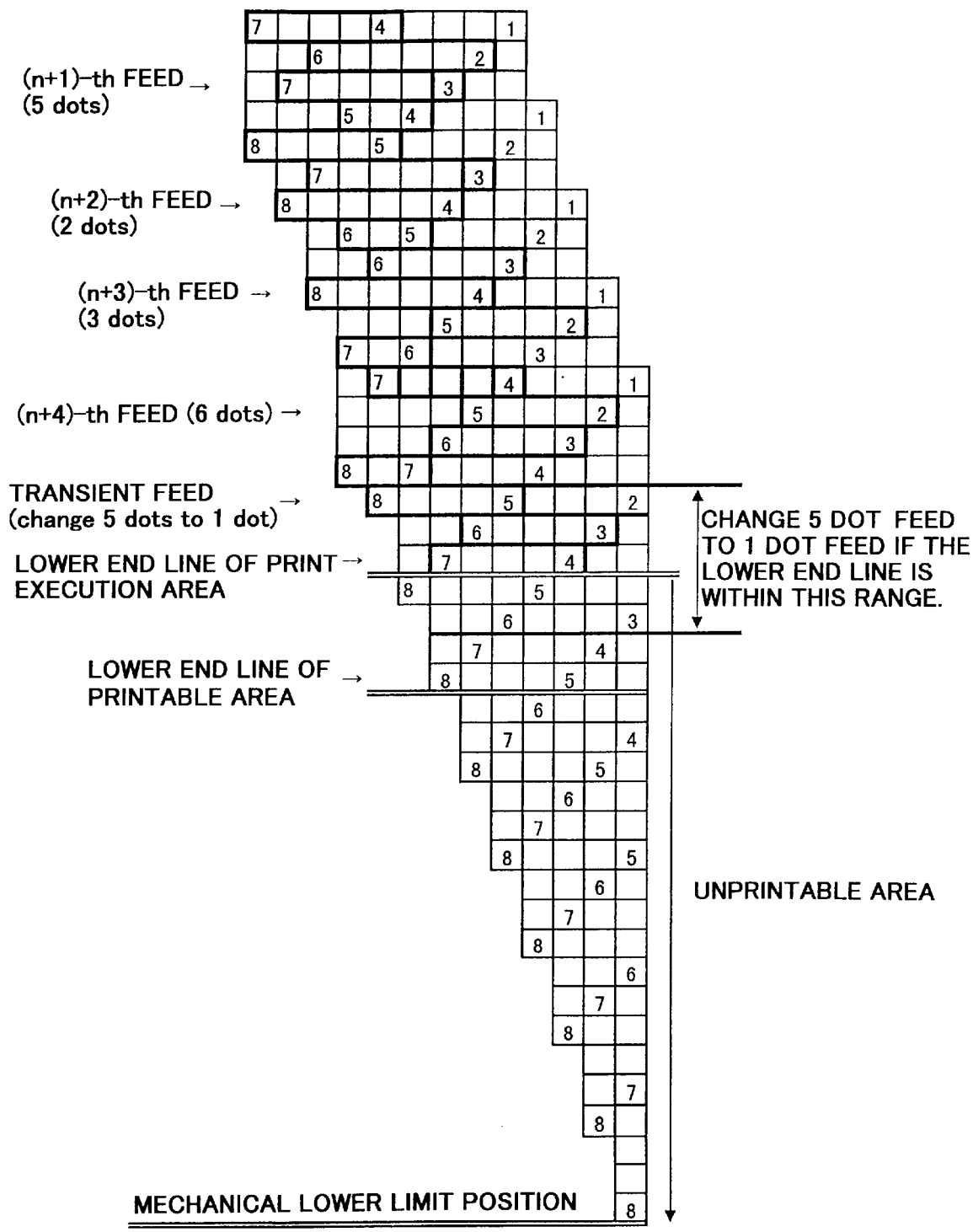

FIGS. 17 and 18 show Example 1 of the lower end recording scheme in the first embodiment. The dot recording scheme of FIGS. 17 and 18 is similar to that of FIGS. 15 and 16. The only difference from that of FIGS. 15 and 16 is that the lower end line of the print execution area is set above the lower end line of the printable area as shown in FIG. 18. This is because the position of the lower end line of the print execution area on the sheet depends upon the sheet settings in the printer driver and the page settings in the applications program. In actual procedure, the lower end line of the print execution area is determined according to the sheet settings and the page settings, and parameters of the lower end dot recording scheme is determined so that the printable area includes the lower end line of the print execution area.

In the example of FIG. 18, it is determined whether or not the 5-dot sub-scan feed is to be changed to the transient feed of one dot in the following manner. When the 5-dot sub-scan feed in the course of the irregular feeding of the middle area recording scheme causes the lower-end nozzle on the print head to reach the position on or after the lower end line of the print execution area, it is determined that the 5-dot sub-scan feed is to be changed to the transient feed of one dot. The expression of "when the lower-end nozzle on the print head reaches the position on or after the lower end line of the print execution area" includes the case where the lower-end nozzle is located at the lower end line of the print execution area and the case where the lower-end nozzle goes beyond the lower end line. If the sub-scan feed amount is not equal to 5 dots when the lower-end nozzle on the print head reaches the position on or after the lower end line of the print execution area, a different determination procedure is adopted as described later in other examples of the lower end recording scheme.

FIG. 18 also shows the range of the lower end line which is used in determining whether the 5-dot sub-scan feed is to be changed to the transient feed of one dot. When the lower end line of the print execution area is present within this range of five raster lines, the 5-dot sub-scan feed causes the lower-end nozzle to reach the position on or after the lower end line of the print execution area. It is accordingly determined that the 5-dot sub-scan feed is to be changed to the transient feed of one dot. At the time of the main scan after the transient feed, the upper-most nozzle #1 is positioned on a raster line fully recorded as shown in FIG. 17, and is thereby not used for actual recording at this position.

In the lower end recording scheme, the dot positions to be recorded by the respective nozzles are also determined for each main scan, in addition to the determination of whether or not the transient feed is required. By way of example, recording of the raster line, which is scanned by the upper-most nozzle #1 at the time of the main scan after the transient feed of one dot shown in FIG. 17, has been completed by the eighth nozzle and the fourth nozzle in the middle area recording. The first nozzle accordingly does not record any dots on this raster line. The raster line scanned by the second nozzle, on the other hand, has the dots recorded at every other dot position by the fifth nozzle in the middle area recording, so that the second nozzle records dots at the remaining alternate dot positions. In the subsequent lower end recording scheme by the constant 3-dot sub-scan feeds, the dot positions recorded by the respective nozzles during each main scan are selected in a similar manner based on the history of dot recording.

Although the 3-dot feed is repeated in this lower end recording scheme, constant sub-scan feed of a plurality of dots can be adopted in general. The constant sub-scan feed of a plurality of dots improves the picture quality. There is a strong possibility that the 1-dot minute feed will accumulate the mechanical errors in sub-scan feed amounts and deteriorate the picture quality. The sub-scan feed of a plurality of dots effectively reduce this possibility. For the further improvement in picture quality, it is preferable that the identical number of scan repeats is set for both the lower end recording scheme and the middle area recording scheme.

Figure 19:
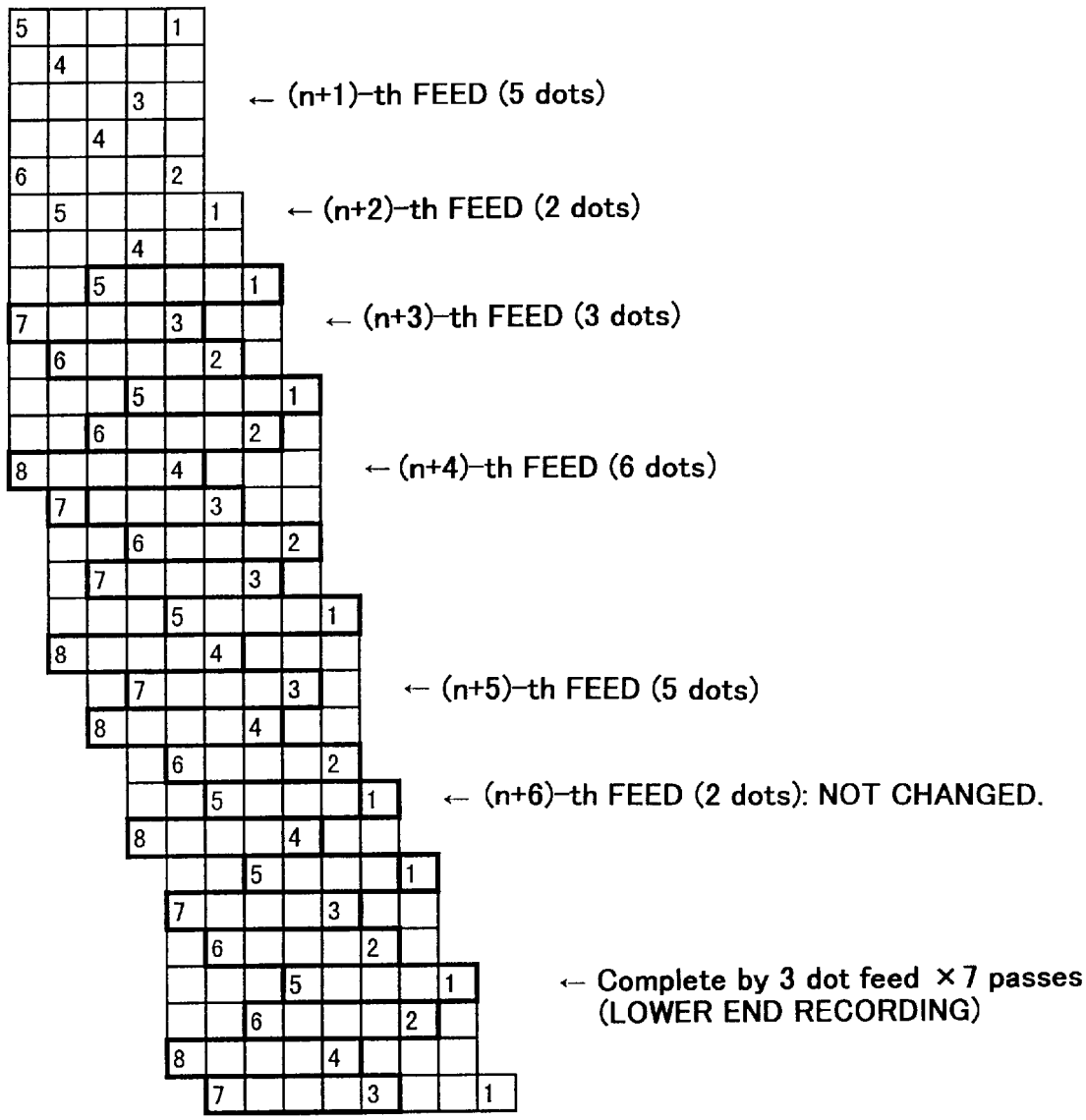
FIGS. 19 and 20 show a second example of the lower end recording scheme in the first embodiment.
Figure 20:
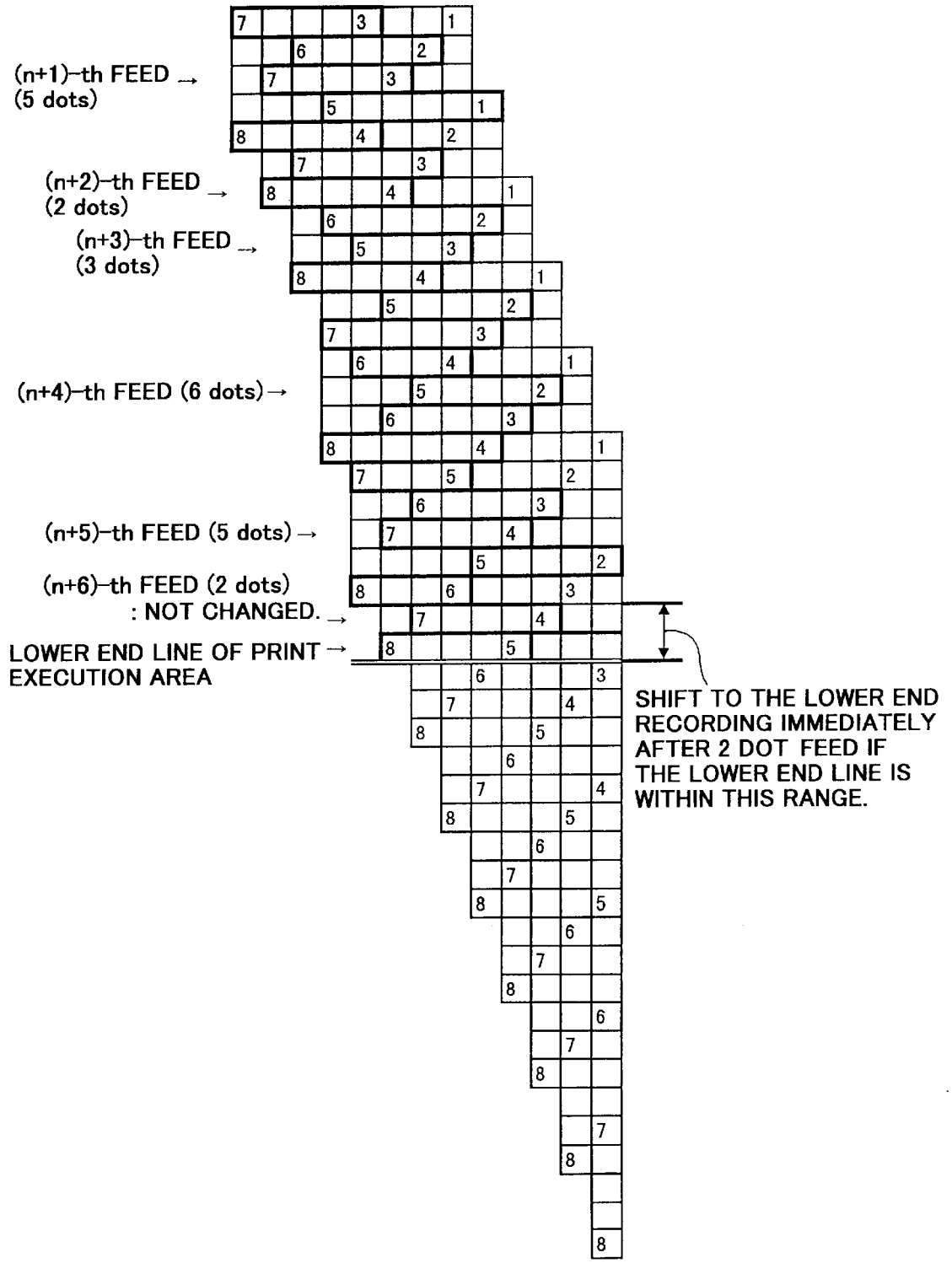

FIGS. 19 and 20 show Example 2 of the lower end recording scheme in the first embodiment. The scanning process of FIGS. 19 and 20 up to the (n+5)-th sub-scan feed is identical with that of FIGS. 13 and 14 without the lower end recording scheme. The example of FIGS. 19 and 20 carries out the (n+6)-th sub-scan feed of 2 dots with no change and shifts to the lower end recording scheme where the constant 3-dot sub-scan feeds are applied. In Example 2 of the lower end recording scheme, the (n+6)-th sub-scan feed may be regarded as the "transient feed", or alternatively it may be considered that the lower end recording scheme is executed immediately after the middle area recording without the transient feed.

In Example 2 of the lower end recording scheme, it is determined that the lower end recording scheme is to be carried out immediately after the (n+6)-th sub-scan feed in the following manner. When the 2-dot sub-scan feed in the course of the irregular feeding of the middle area recording causes the lower-end nozzle on the print head to reach the position on or after the lower end line of the print execution area, it is determined that the lower end recording scheme should be carried out immediately after the 2-dot sub-scan feed with no change. FIG. 20 shows the range of the lower end line which is used in determining whether the lower end recording scheme should start immediately after the 2-dot sub-scan feed. When the lower end line of the print execution area is present within this range of two raster lines, the 2-dot sub-scan feed causes the lower-end nozzle to reach the position on or after the lower end line of the print execution area. It is accordingly determined that the lower end recording scheme should start immediately after the 2-dot sub-scan feed.

In Example 2 of the lower end recording scheme, the dot positions to be recorded by the respective nozzles during each main scan are determined based on the history of dot recording in the middle area recording scheme. By way of example, the raster line on the lower end of FIG. 19 is scanned by the first nozzle in the second main scan of the lower end recording scheme. Recording of this raster line, however, has been completed by the seventh nozzle and the third nozzle in the middle area recording. The first nozzle accordingly does not record any dots on this raster line. In the example of FIG. 20, those raster lines which are scanned by three different nozzles are not recorded by the thirdly-passing nozzle. On the raster lines where some dot positions have been left unrecorded in the middle area recording, on the other hand, the lower end recording scheme executes recording of the remaining dot positions.

Figure 21:
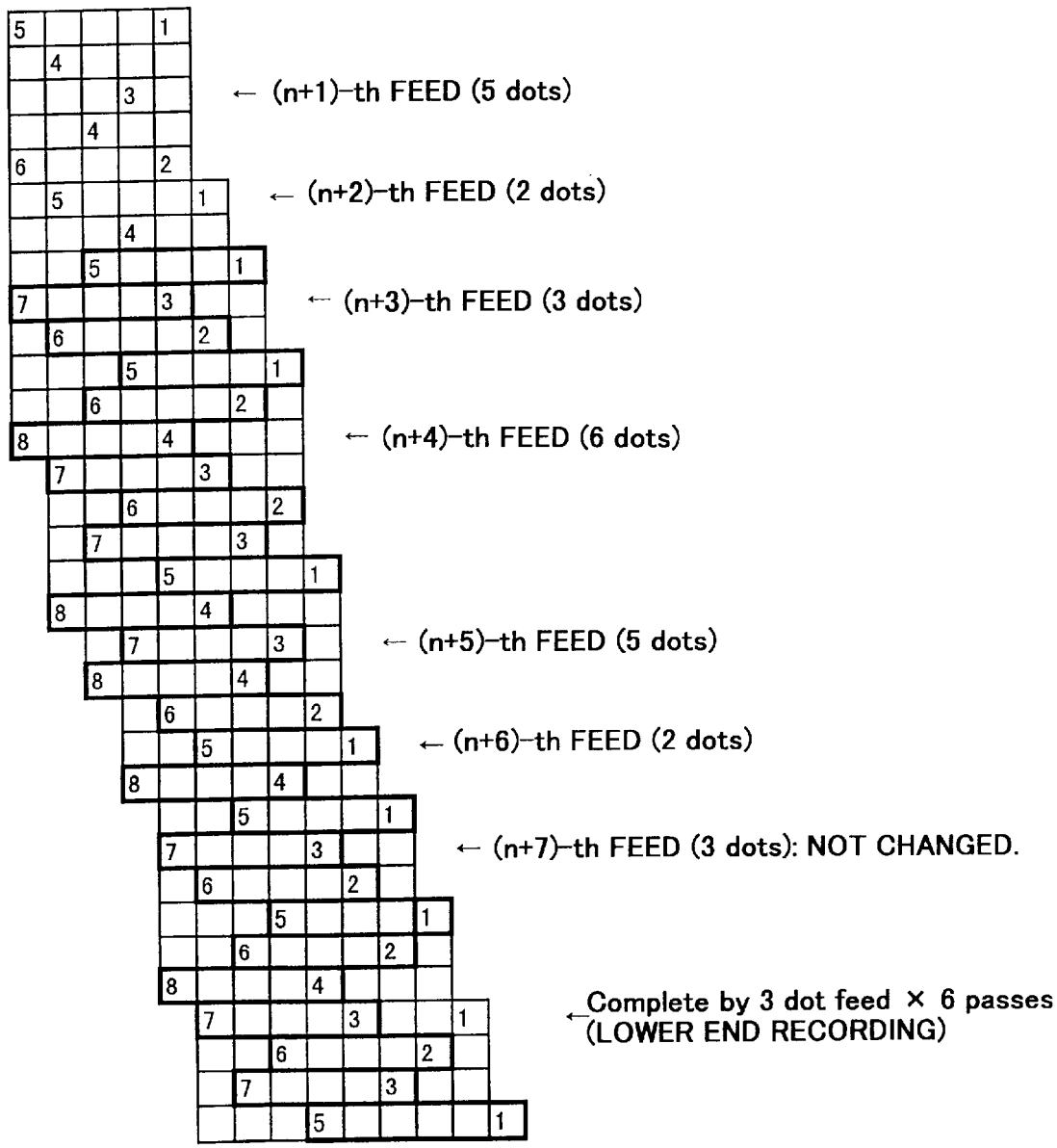
FIGS. 21 and 22 show a third example of the lower end recording scheme in the first embodiment.
Figure 22:
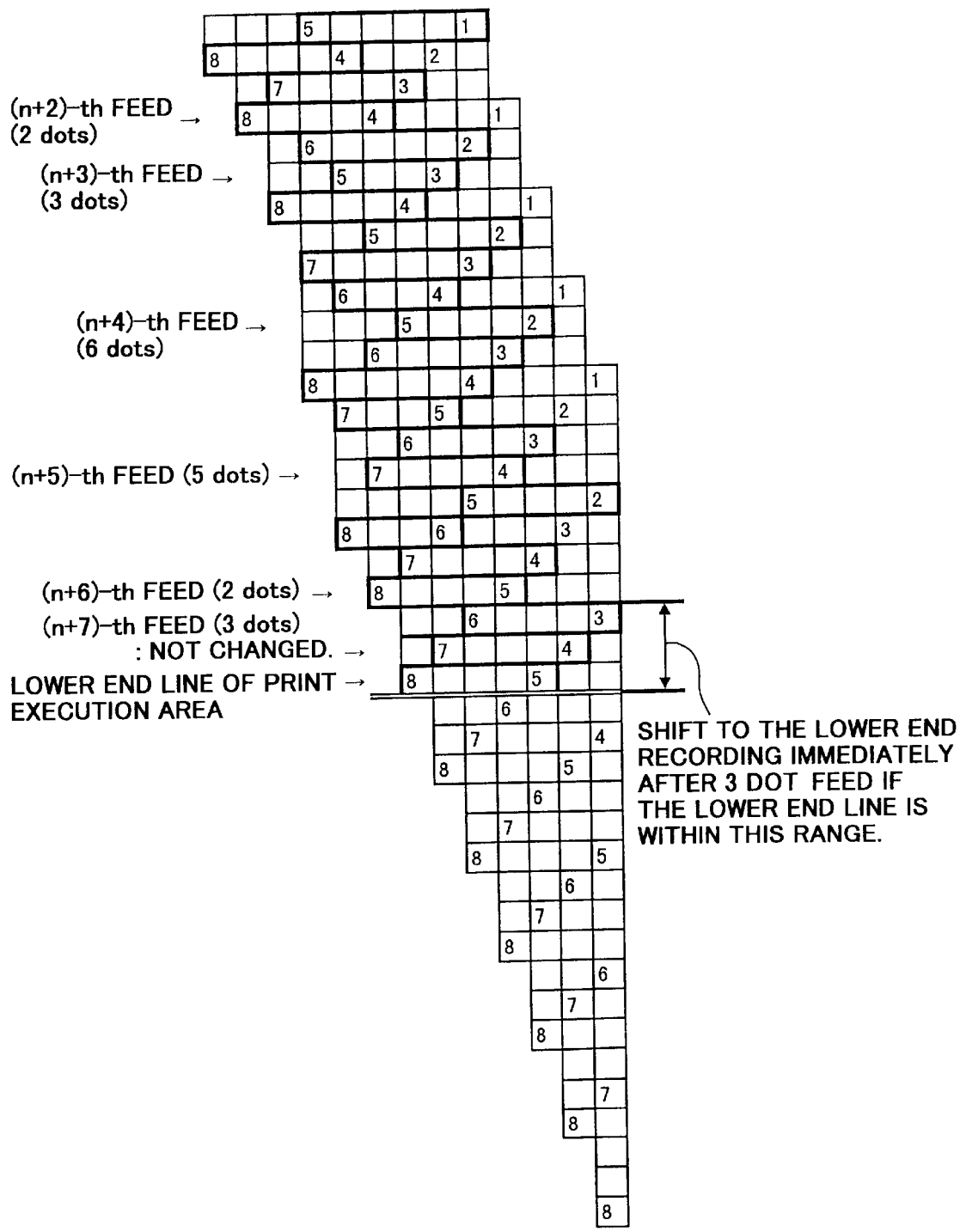

FIGS. 21 and 22 show Example 3 of the lower end recording scheme in the first embodiment. The scanning process of FIGS. 21 and 22 up to the (n+6)-th sub-scan feed is identical with that of FIGS. 13 and 14 without the lower end recording scheme. The example of FIGS. 21 and 22 carries out the (n+7)-th sub-scan feed of 3 dots with no change and shifts to the lower end recording scheme where the constant 3-dot sub-scan feeds are applied. As mentioned in Example 2 and Example 3 of the lower end recording scheme, the (n+7)-th sub-scan feed may be regarded as the "transient feed", or alternatively it may be considered that the lower end recording scheme is executed immediately after the middle area recording without the transient feed.

In Example 3 of the lower end recording scheme, it is determined that the lower end recording scheme is to be carried out immediately after the (n+7)-th sub-scan feed in the following manner. When the 3-dot sub-scan feed in the course of the irregular feeding of the middle area recording causes the lower-end nozzle on the print head to reach the position on or after the lower end line of the print execution area, it is determined that the lower end recording scheme is to be carried out immediately after the 3-dot sub-scan feed with no change. FIG. 22 shows the range of the lower end line which is used in determining whether the lower end recording scheme should start immediately after the sub-scan feed of 3 dots. When the lower end line of the print execution area is located within this range of three raster lines, the 3-dot sub-scan feed causes the lower-end nozzle to reach the position on or after the lower end line of the print execution area. It is accordingly determined that the lower end recording scheme should start immediately after the sub-scan feed of 3 dots.

In Example 3 of the lower end recording scheme, the dot positions to be recorded by the respective nozzles during each main scan are determined based on the history of dot recording in the middle area recording, although the details are not described here.

Figure 23:
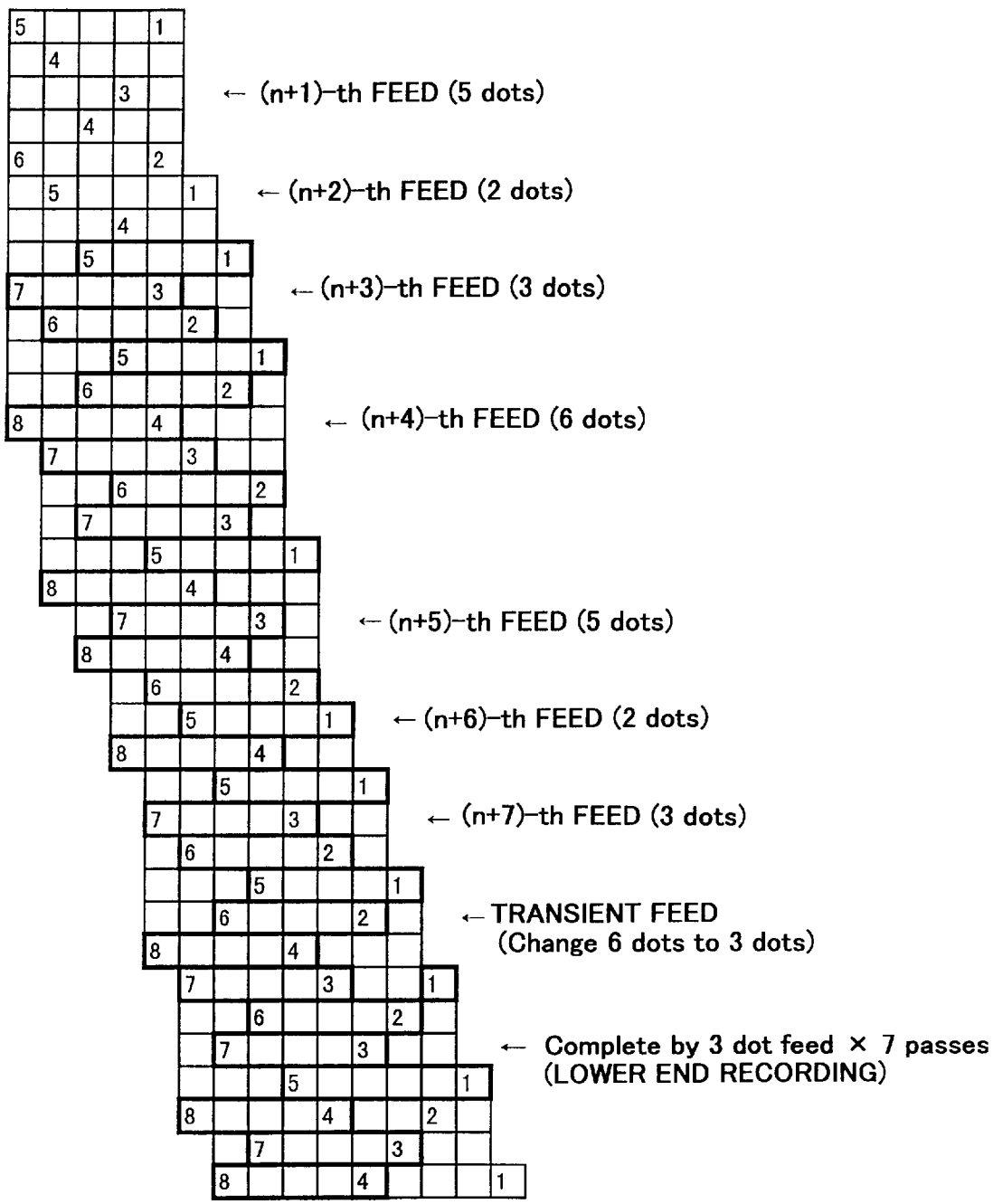
FIGS. 23 and 24 show a fourth example of the lower end recording scheme in the first embodiment.
Figure 24:
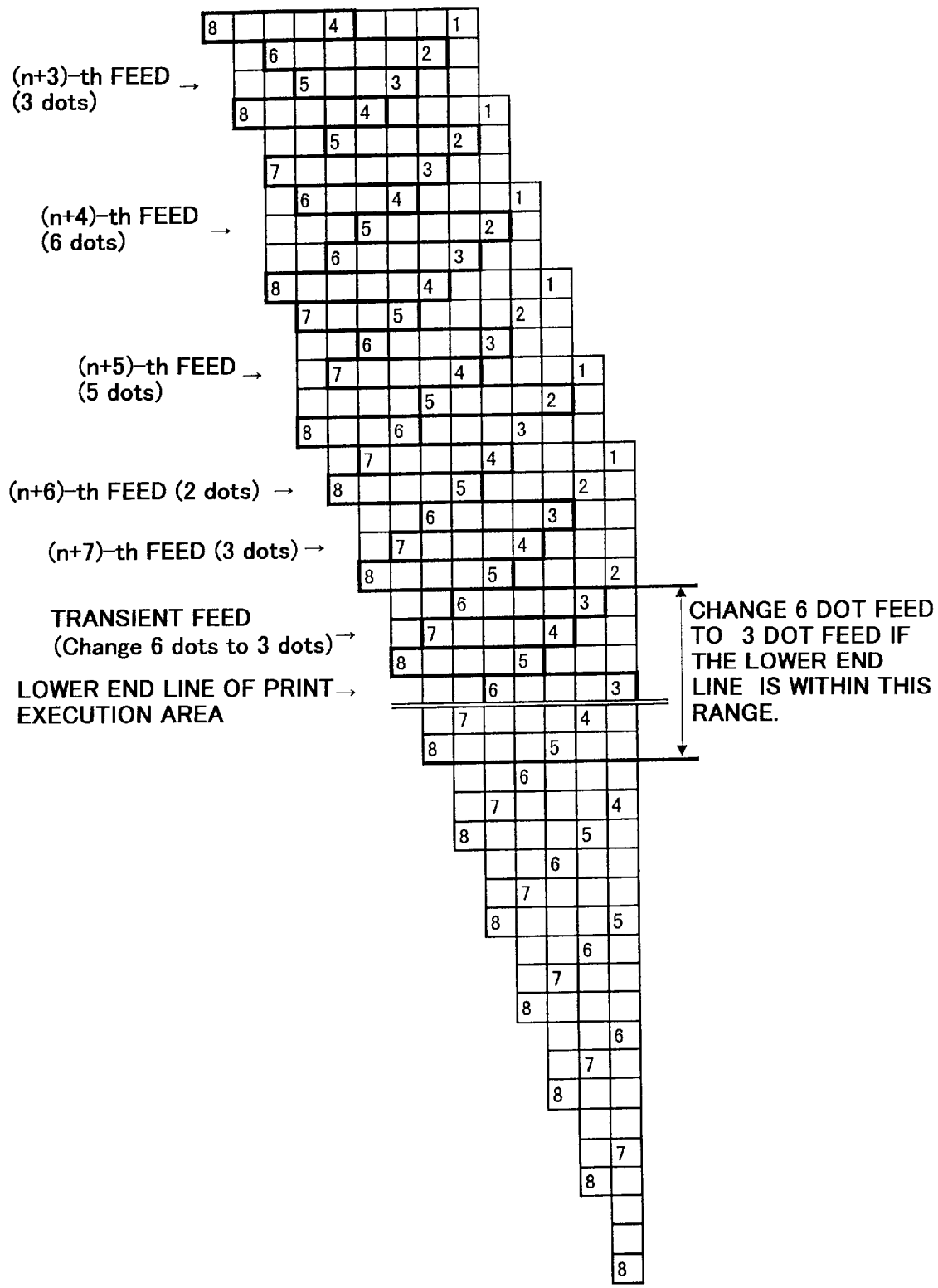

FIGS. 23 and 24 show Example 4 of the lower end recording scheme in the first embodiment. The scanning process of FIGS. 23 and 24 up to the (n+7)-th sub-scan feed is identical with that of FIGS. 13 and 14 without the lower end recording scheme. The example of FIGS. 23 and 24 changes the (n+8)-th sub-scan feed of 6 dots to the transient feed of 3 dots and shifts to the lower end recording scheme where the constant sub-scan feeds are applied.

In Example 4 of the lower end recording scheme, it is determined whether or not the 6-dot sub-scan feed is to be changed to the transient feed of 3 dots in the following manner. When the 6-dot sub-scan feed in the course of the irregular feeding of the middle area recording causes the lower-end nozzle on the print head to reach the position on or after the lower end line of the print execution area, it is determined that the 6-dot sub-scan feed is to be changed to the transient feed of 3 dots. FIG. 24 shows the range of the lower end line which is used in determining whether the 6-dot sub-scan feed is to be changed to the transient feed of 3 dots. When the lower end line of the print execution area is present within this range of six raster lines, the 6-dot sub-scan feed causes the lower-end nozzle to reach the position on or after the lower end line of the print execution area. It is accordingly determined that the 6-dot sub-scan feed is to be changed to the transient feed of 3 dots.

In Example 4 of the lower end recording scheme, the dot positions to be recorded by the respective nozzles during each main scan are determined based on the history of dot recording in the middle area recording, although the details are not described here.

In Examples 1 through 4 of the lower end recording scheme described above, it may appear that the necessity of the transient feed and the transient feed amount are determined only based on the sub-scan feed amount at the time when the lower-end nozzle would reach the position on or after the lower end line of the print execution area. Actually, however, the necessity of the transient feed and the transient feed amount depend upon the history of the plural sub-scan feeds up to the position of the lower end line of the print execution area. Even if a specific sub-scan feed amount is identical at the time when the lower-end nozzle would reach the position on or after the lower end line of the print execution area, the necessity of the transient feed and the transient feed amount may be determined differently depending on the recording mode applied for the middle area recording, that is, on the history of the preceding sub-scan feeds.

All Examples 1 through 4 of the lower end recording scheme described above are possible even when the printer adopts an identical recording mode for the middle area recording, depending on the sheet settings and the page settings. The printer driver thus determines which one of Examples 1 through 4 of the lower end recording scheme is applied on the basis of the sheet settings and the page settings, and shifts the dot recording scheme from the middle area recording to the lower end recording accordingly.

Figure 25:
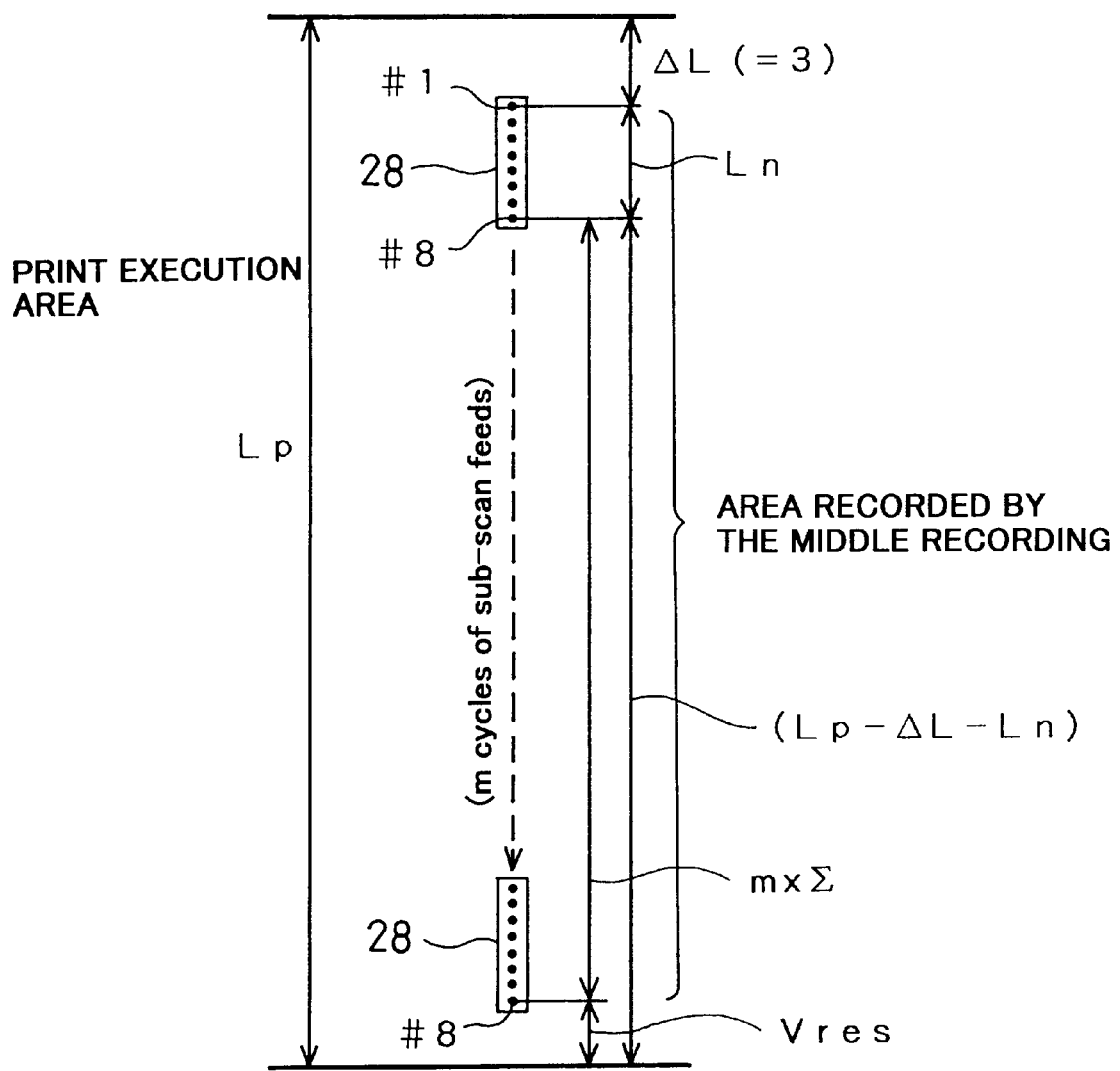
FIG. 25 shows a first example of the upper end recording scheme in a second embodiment.

FIG. 25 shows sub-scan feeds through the print execution area. In FIG. 25, m times of unit cycles of sub scan-feeds are completed in the middle area recording. The reference symbol Vres indicates the number of raster lines left unrecorded in the print execution area after the lower-end nozzle #8; the Vres lines are to be recorded by the lower end recording. It is assumed here that one unit cycle is constituted with 5-, 2-, 3-, and 6-dot feeds as shown in FIGS. 9(A) and 9(B). The upper-end nozzle #1 of the head 28 is positioned lower than the upper end of the print execution area by a distance ΔL when the middle area recording starts.

The number of residue lines Vres is given by:

$$Vres=\{(Lp-\Delta L-Ln)\%\Sigma\} \quad (1)$$

where Lp denotes the length of the print execution area in the sub-scanning direction; ΔL denotes the distance between the upper end of the print execution area (this is equivalent to the upper end of the printable area) and the upper end of the area recorded by the middle area recording; Ln denotes the distance between the upper-end nozzle #1 and the lower-end nozzle #8; Σ denotes the total of the sub-scan feed amounts in one unit cycle in the middle area recording; and the operator "%" denotes an operation of taking the remainder of the division. The value Vres assumes integers between 0 and 15 because Σ, the total of the sub-scan feed amounts in one unit cycle, is 16 for the recording scheme of FIGS. 9(A) and 9(B). All the values in Equation (1) are expressed by the unit of [dots] (that is, the number of raster lines).

One of the above Examples 1–4 of the lower end recording is selected based on the value of Vres as follows:

when 1≦Vres<6: Example 1 (FIGS. 17, 18);
when 6≦Vres<8: Example 2 (FIGS. 19, 20);
when 8≦Vres<11: Example 3 (FIGS. 21, 22); and
when 11≦Vres<17: Example 4 (FIGS. 23, 24);

where it should be noted that Vres and (Vres−16) are equivalent.

In the first embodiment described above, it is determined whether or not the transient feed is necessary between the sub-scan feeds of the middle area recording and the sub-scan feeds of the lower end recording based on the history of the sub-scan feeds in the vicinity of the lower end of the print execution area. If the transient feed is necessary, it is carried out prior to the lower end recording scheme. The dot positions to be recorded after the transient feed and in the lower end recording are determined according to the history of dot recording. This arrangement enables a smooth shift from the middle area recording to the lower end recording when the lower end recording scheme executes the sub-scan feeds of a plurality of dots. This arrangement especially ascertains a smooth shift from the middle area recording to the lower end recording when the irregular feeding technique is adopted for the middle area recording scheme.

In the first embodiment, the "transient feed" is defined as the sub-scan feed carried out between the middle area recording and the lower end recording. The "transient feed" may alternatively be defined as part of the lower end recording; that is, as the first sub-scan feed executed in the beginning of the lower end recording. This specification mainly uses the latter definition; that is, the "transient feed" is part of the lower end recording scheme.

The sub-scan feed pattern shown in FIG. 12 may be used in common for the upper end recording scheme in the first embodiment. In other words, in the first embodiment, one of a plurality of sub-scan feed patterns (Examples 1 through 4) for the lower end recording scheme is selected according to the length of the print execution area so that a predetermined sub-scan feed pattern is applied in common for the upper end recording scheme.

E. Second Embodiment (Upper end recording scheme)

Contrary to the first embodiment, the second embodiment uses only one specific sub-scan feed pattern for the lower end recording scheme and selects one of a plurality of sub-scan feed patterns for the upper end recording scheme. It is here assumed that Example 4 of the recording scheme shown in FIGS. 23 and 24 is used for the lower end recording and that the recording scheme shown in FIGS. 9(A), 9(B) and 10 is applied for the middle area recording.

Figure 26:
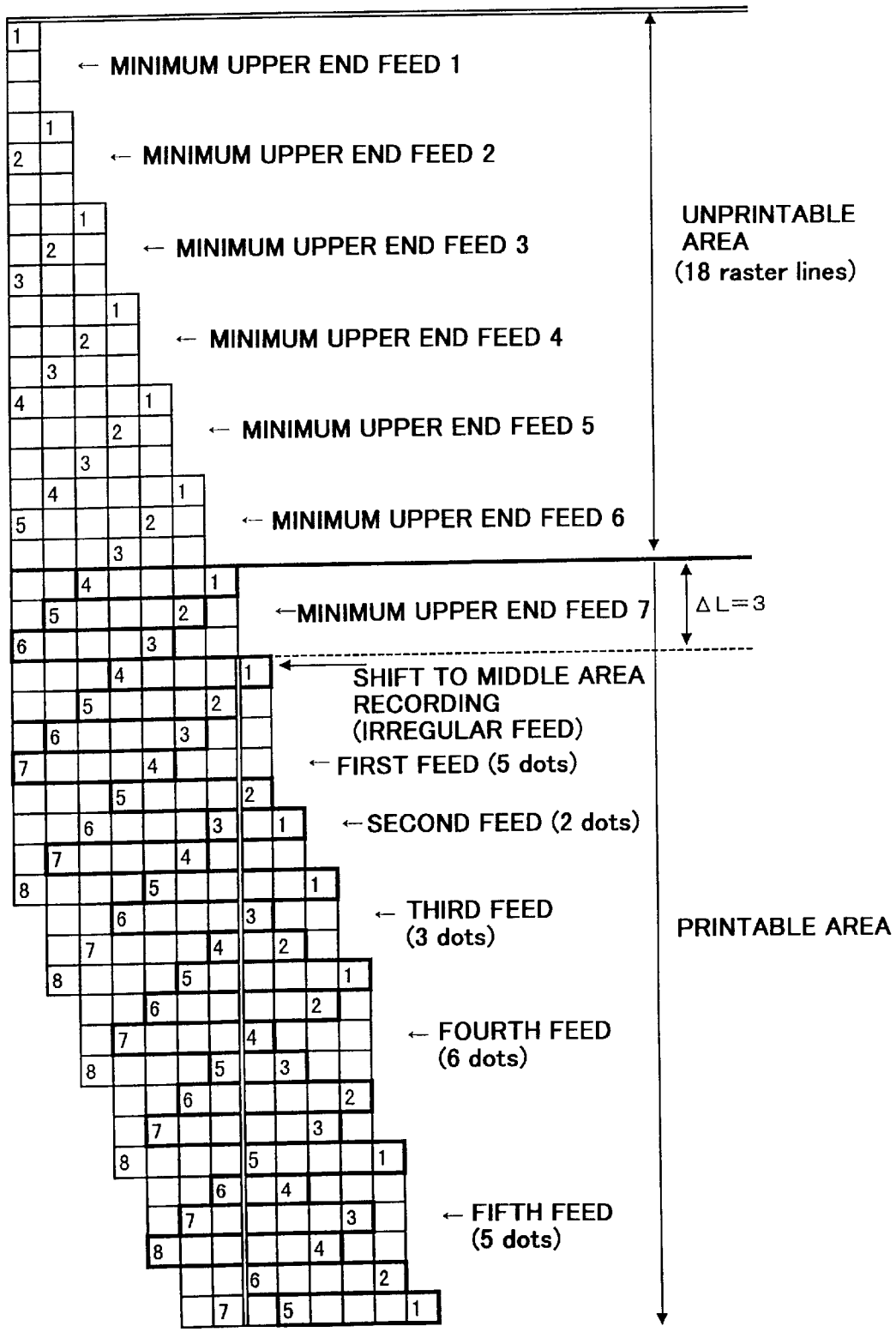
FIG. 26 shows the recording pattern of the first example of the upper end recording scheme in the second embodiment.

FIG. 26 shows Example 1 of the upper end recording scheme in the second embodiment. The dot recording scheme of FIG. 26 is the same as that shown in FIGS. 15 and 16, which is used in the first embodiment.

FIG. 27 is a table showing the recording pattern of Example 1 of the upper end recording scheme shown in FIG. 26. The upper half of the table shows the range of the upper end recording, whereas the lower half shows the range of the middle area recording. The numerals at each row of the nozzle numbers #1 through #8 show which of the raster lines in the printable area is recorded by the nozzle after each sub-scan feed. The symbol "n/a" indicates that the nozzle is not used in recording after the sub-scan feed. For example, the nozzle #1 is not actually used until the fifth sub-scan feed (that is, until the sixth main scan), and is used in recording on the first raster line during the main scan after the sixth sub-scan feed. The "feed" row indicates the feed amount in dots for each sub-scan feed. The "even/odd" row indicates whether the odd position or the even position on the raster line is recorded by the nozzle.

As can be understood from this table, the dot positions recorded by the respective nozzles in the upper end recording scheme are selected so that all the nozzles to be used in the middle area recording scheme are actually used in the middle area recording. This arrangement stabilizes the recording process in the area to be recorded by the middle area recording, and thereby stabilizing picture quality in the area.

In Example 1 of the upper end recording shown in FIGS. 26 and 27, 3-dot sub-scan feed is repeated seven times before the middle area recording starts. In the middle area recording, the unit cycle of the sub-scan feed pattern is repeated plural times; each unit cycle is constituted by the sub-scan feeds of (5, 2, 3, 6) dots, which is shown in FIGS. 9(A) and 9(B).

The above described FIG. 25 also applies to Example 1 of the second embodiment shown in FIGS. 26 and 27. In FIG. 26, ΔL=3 where ΔL is the distance between the upper end of the print execution area and the upper end of the area recorded by the middle area recording. The "area recorded by the middle area recording scheme" is between the upper-most raster line recorded during the main scan immediately before the first sub-scan feed of the middle area recording (in the example of FIG. 26, the main scan immediately before the first sub-scan feed of 5 dots), and the lower-most raster line recorded during the main scan after the last sub-scan feed of the middle area recording.

In the second embodiment, the number of sub-scan feeds in the upper end recording scheme is selected based on the value Vres given Equation (1) so that Example 4 of the lower end recording scheme shown in FIGS. 23 and 24 is always applicable:

when 11≦Vres<17: Example 1 of the upper end recording scheme (FIGS. 26 and 27);
when 17≦Vres<20 (that is, when 1≦Vres<4): add one 3-dot feed to Example 1 of the upper end recording scheme;
when 20≦Vres<23 (that is, when 4≦Vres<7): add two 3-dot feeds to Example 1 of the upper end recording scheme;
when 23≦Vres<26 (that is, when 7≦Vres<10): add three 3dot feeds to Example 1 of the upper end recording scheme; and
when Vres=26 (that is, when Vres=10): add four 3-dot feeds to Example 1 of the upper end recording scheme;

where it should be noted that Vres and (Vres−16) are equivalent.

Figure 28:
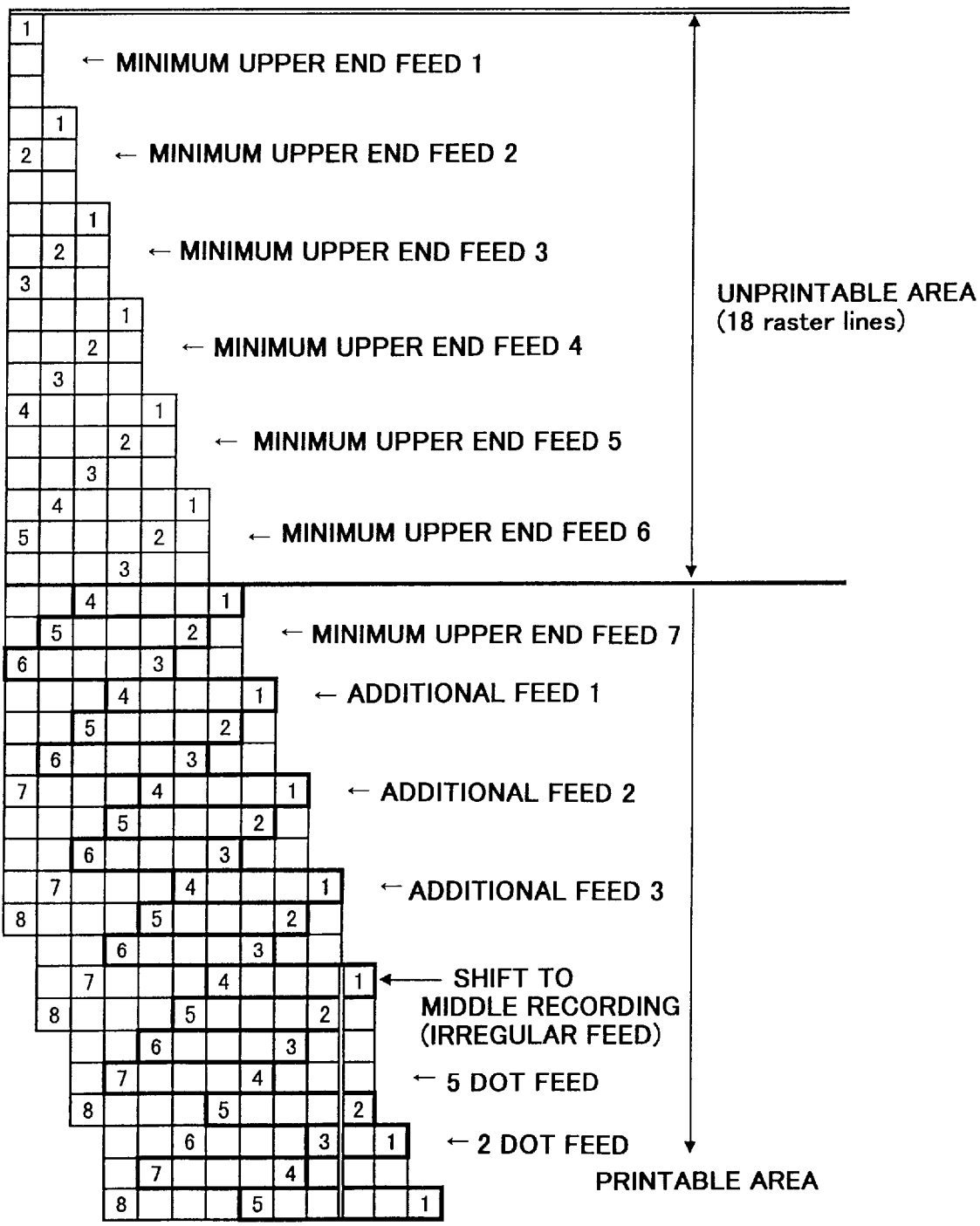
FIG. 28 shows a second example of the upper end recording scheme in the second embodiment.

FIG. 28 shows Example 2 of the upper end recording scheme in which three 3-dot sub-scan feeds are added to Example 1 of the upper end recording scheme in the second embodiment when 7≦Vres<10. In FIG. 28, the "minimum upper end feed" means Example 1 of the upper end recording scheme in the second embodiment; that is, seven 3-dot feeds. FIG. 29 is a table showing the recording pattern of Example 2 of the upper end recording scheme. In the same manner as in Example 1 of the upper end recording scheme, in Example 2 of the upper end recording scheme, the dot positions to be recorded by the respective nozzles in the upper end recording scheme are selected so that all the nozzles to be used in the middle area recording scheme are actually used in the middle area recording.

As can be understood from the comparison of FIGS. 26 and 28, while the starting position of the printable area is not changed, the starting position of the middle area recording is shifted below by the distance corresponding to the summation of the additional sub-scan feed amounts (3 dots×3). As a result, Example 4 of the lower end recording scheme shown in FIGS. 23 and 24 can be used on the lower end of the print execution area even when 7≦Vres<10.

F. Third Embodiment (Another Upper end recording scheme)

Figure 30:
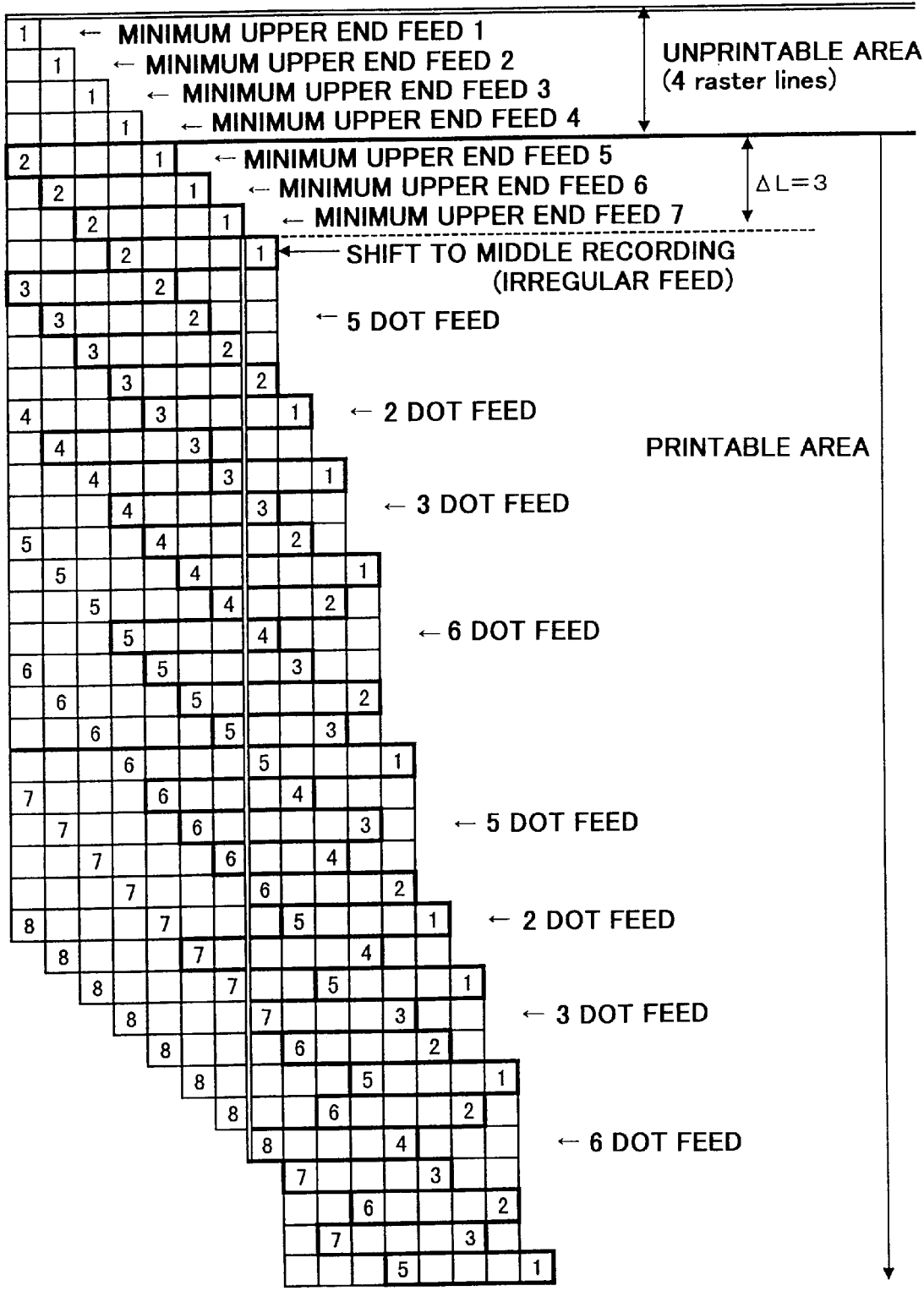
FIG. 30 shows a first example of the upper end recording scheme in a third embodiment.

FIG. 30 shows Example 1 of the upper end recording scheme in the third embodiment. In Example 1 of FIG. 30, 1-dot sub-scan feed (that is, minute feeding) is repeated seven times before the middle area recording starts. FIG. 31 shows the recording pattern of Example 1 of the upper end recording scheme in the third embodiment. In Example 1 of the upper end recording scheme of the third embodiment, the dot positions to be recorded by the respective nozzles in the upper end recording are also selected so that all the nozzles to be used in the middle area recording scheme are actually used in the middle area recording. It is here assumed that the third embodiment uses the same middle area recording scheme and lower end recording scheme as those of the second embodiment.

Example 1 of the upper end recording scheme in the third embodiment has an advantage over Example 1 of the upper end recording scheme in the second embodiment shown in FIG. 28 in that Example 1 of the third embodiment can expand the printable area. Example 1 of the second embodiment, however, requires less number of sub-scan feeds than Example 1 of the third embodiment.

In the third embodiment, the sub-scan feeds are added to the upper end recording scheme as follows:

when 11≦Vres<17: Example 1 of the upper end recording scheme (FIGS. 30 and 31); and when 1≦Vres<11: add Vres times of 1-dot feed to Example 1 of the upper end recording scheme.

Figure 32:
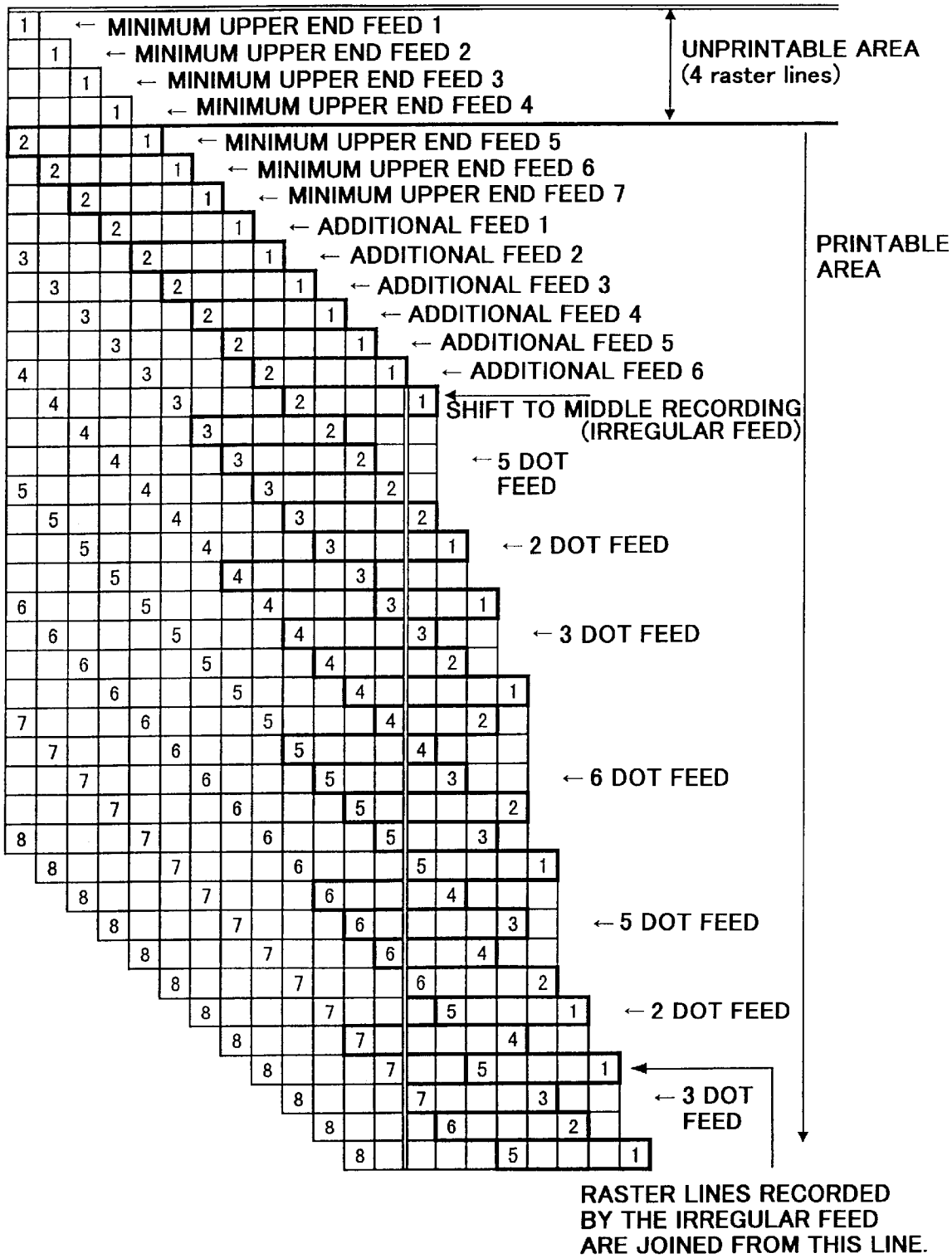
FIG. 32 shows a second example of the upper end recording scheme in the third embodiment.
Figure 34:
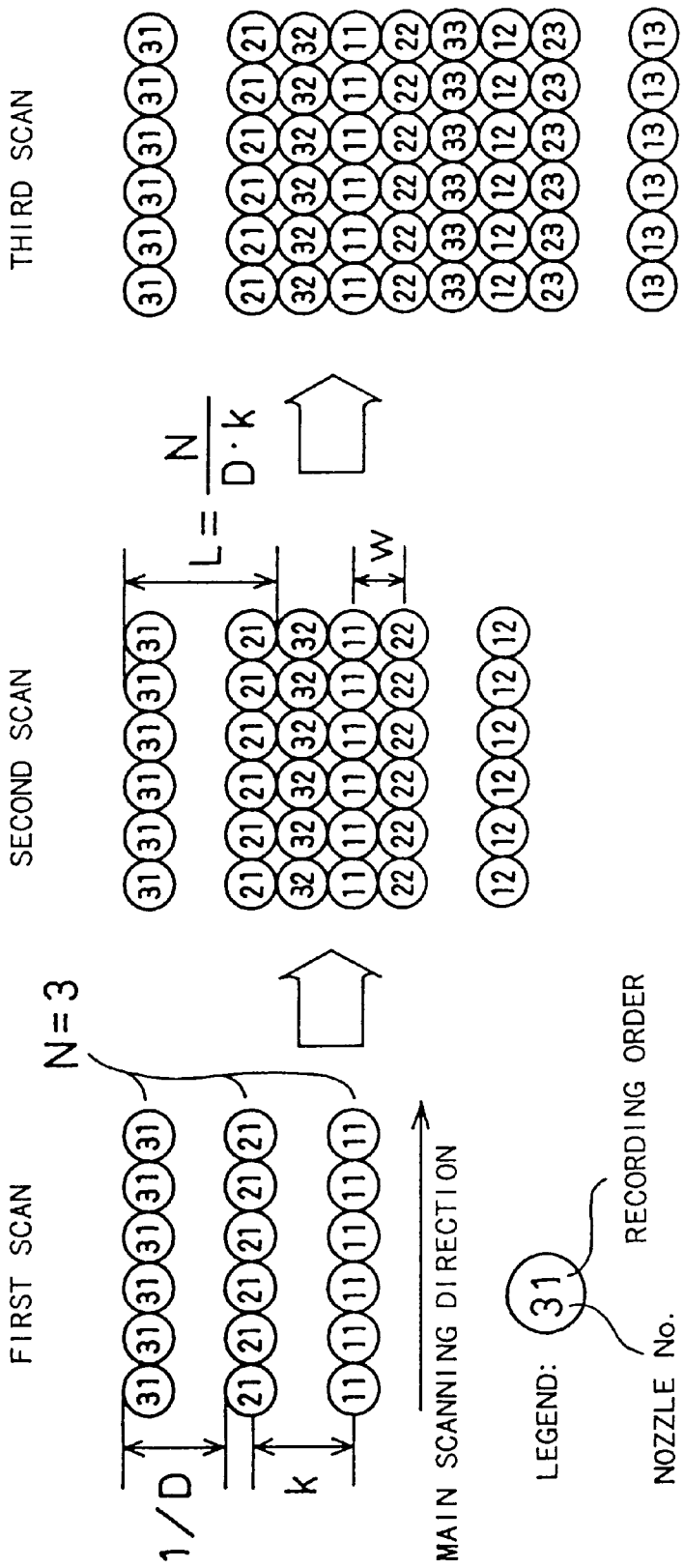
FIG. 34 shows an example of the interlace scheme.
Figure 35:
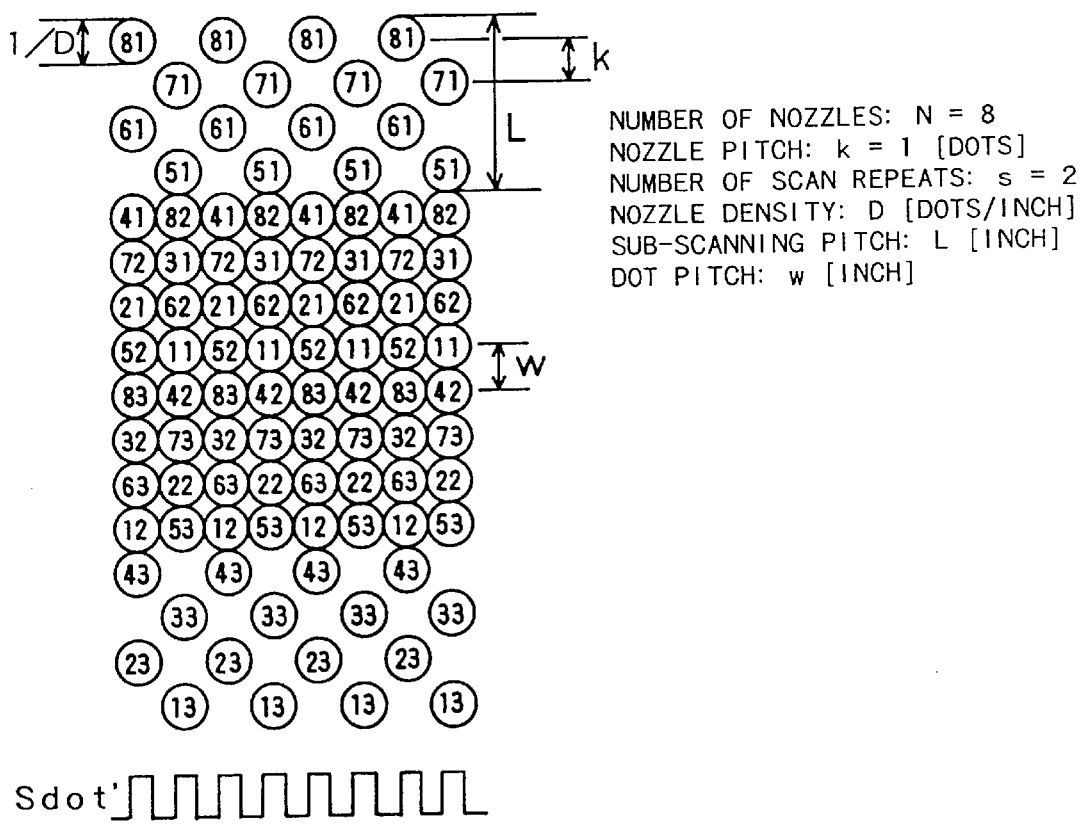
FIG. 35 shows an example of the overlap scheme.

FIG. 32 shows Example 2 of the upper end recording scheme in which 1-dot sub-scan feed is added six times to Example 1 of the upper end recording scheme in the third embodiment. In FIG. 32, the "minimum upper end feed" means Example 1 of the upper end recording scheme in the third embodiment. FIG. 33 shows the recording pattern of Example 2 of the upper end recording scheme.

In the second and the third embodiments, the number of sub-scan feeds in the upper end recording is determined based on the value Vres given by Equation (1) so that a predetermined sub-scan feed pattern can be used in the lower end recording scheme. This arrangement advantageously simplifies the sub-scan feed pattern of the lower end recording scheme.

Although both the second and the third embodiments adopt Example 4 of the lower end recording scheme shown in FIGS. 23 and 24, other examples of the lower end recording scheme (for example, Examples 1 through 3 of the lower end recording scheme shown in FIGS. 17 through 22) may be applied instead. If these Examples 1–3 are used instead of Example 4 of FIGS. 23 and 24, the relationship between the value range of Vres and the number of additional sub-scan feeds in the upper end recording is changed. For example, if Example 1 of the lower end recording shown in FIGS. 17 and 18 is used instead of Example 4 shown in FIGS. 23 and 24 in the third embodiment, the relationship between the value range of Vres and the number of additional sub-scan feeds in the upper end recording described above is changed as follows:

when 1≦Vres<6: Example 1 of the upper end recording scheme (FIGS. 30 and 31); and when 6≦Vres<17: add (Vres−5) times of 1-dot feed to Example 1 of the upper end recording scheme.

In Examples 1 through 3 of the lower end recording scheme shown in FIGS. 17 through 22, the last sub-scan feed of the middle area recording is not the last 6-dot sub-scan feed of one unit cycle. In other words, Examples 1 through 3 of the lower end recording scheme shown in FIGS. 17 through 22 do not complete one unit cycle of sub-scan feed at the end of the middle area recording. In order to maintain the meaning of the value Vres to be the number of residual lines to be recorded by the lower end recording, Vres may be given by the following Equation (2) instead of Equation (1):

$$Vres=\{(Lp-\Delta L-Ln-\delta)\%\Sigma\} \quad (2)$$

where δ denotes the total of the "sub-scan feed amounts carried out in the end of the middle area recording that do not complete one unit cycle". For example, in Example 1 of the lower end recording scheme shown in FIG. 18, δ is 5 dots. In Example 2 of the lower end recording scheme shown in FIG. 20, δ is 7 dots. In Example 3 of the lower end recording scheme shown in FIG. 22, δ is 10 dots. Example 4 of the lower end recording scheme shown in FIG. 24 is considered as the case where δ is 0. It may be thought that the value δ in Equation (2) indicates a predetermined value relating to the positional relationship between the head at the final recording position in the middle area recording and the lower end line of the print execution area. It should be noted here that Equation (1) and Equation (2) are equivalent while different relationship between the value range of Vres and the number of additional sub-scan feeds in the upper end recording is used depending on which of Equations (1) and (2) is used.

Although the sub-scan feed amounts in the upper end recording scheme is set to a constant value in the second and the third embodiments discussed above, different sub-scan feed amounts may be used in the upper end recording scheme.

The present invention may be modified, for example, as follows. Although the first embodiment adopts the irregular feeding for the middle area recording, the present invention is, however, applicable when the sub-scan feed amounts in the middle area recording is set to a constant value. When the irregular feeding is used in the middle area recording, the amount of the sub-scan feed by which the nozzles reach the lower end line of the print execution area depends on the sheet settings and the page settings. As described in the first embodiment, the amount of the transient feed at the time of shifting from the middle area recording to the lower end recording depends upon the amount of the sub-scan feed by which the nozzles reach the lower end line of the print execution area. The present invention thus attains the significant effects especially when the irregular feeding is adopted for the middle area recording.

Some dot recording modes in the middle area recording do not require any transient feed at the time of shifting to the lower end recording, but allow an immediate shift from the middle area recording to the lower end recording. Even in this case, the dot positions to be recorded by the respective nozzles in each main scan during the lower end recording of the first embodiment are adjusted based on the history of dot recording in the middle area recording in the vicinity of the lower end of the print execution area. The present invention thus effectively prevents occurrence of unrecordable dot positions within the print execution area in the lower end recording scheme even when the transient feed is not required.

In the first embodiment, only one sub-scan feed pattern (especially the sub-scan feed pattern) is provided for the upper end recording scheme, while a plurality of sub-scan feed patterns are provided for the lower end recording scheme so that one of the patterns is to be selected based on the sub-scan feeds in the end of the middle area recording. In the second and the third embodiments, on the other hand, only one sub-scan feed pattern is provided for the lower end recording scheme, while an appropriate pattern is selected from a plurality of sub-scan feed patterns for the upper end recording scheme. It can be the, in general, that an appropriate pattern is selected from a plurality of sub-scan feed patterns for one of the upper end recording scheme and the lower end recording scheme in order to enable a predetermined sub-scan feed pattern to be applied for the opposite end recording.

The number of sub-scan feeds in the upper end recording scheme may be determined to minimize the number of sub-scan feeds in the lower end recording scheme. On the contrary, the number of sub-scan feeds in the lower end recording scheme may be determined to minimize the number of sub-scan feeds in the upper end recording scheme. It can be the, in general, that the number of sub-scan feeds in one of the upper end recording scheme and the lower end recording scheme can be determined to minimize the number of sub-scan feeds in the opposite end recording. In this case, it is preferable that the sub-scan feed amounts in the upper end recording scheme and the lower end recording scheme are respectively set to constant values. The number of the sub-scan feeds in the upper end recording scheme and that in the lower end recording scheme can be determined to minimize the total number of the sub-scan feeds in the upper end recording scheme and the lower end recording scheme.

Some of the hardware circuitry in the above embodiments may be implemented by software executed in a general purpose computer, whereas Some of the software functions may be implemented by hardware circuitry.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dot recording apparatus for recording dots on a printing medium with a dot recording head, comprising:
   a dot forming element array formed on the dot recording head, the dot forming element array having a plurality of dot forming elements which form a plurality of dots of an identical color on the printing medium, the plurality of dots being arrayed at a substantially constant pitch in a sub-scanning direction;
   a main scan drive unit that drives at least one of the dot recording head and the printing medium to carry out a main scan;
   a head drive unit that drives at least part of the plurality of dot forming elements to produce dots during the main scan;
   a sub-scan drive unit that drives at least one of the dot recording head and the printing medium to carry out a sub-scan every time when the main scan is completed; and
   a controller that controls the main scan drive unit, the head drive unit, and the sub-scan drive unit,
   wherein the controller comprises the functions of:
   (i) executing dot recording according to a first recording mode in the vicinity of an upper end of a record execution area of the printing medium;
   (ii) executing dot recording according to a second recording mode in a middle portion of the record execution area;
   (iii) executing dot recording according to a third recording mode in the vicinity of a lower end of the record execution area, the third recording mode being different from the second recording mode at least in a sub-scan feed amount; and
   (iv) selecting one of a plurality of sub-scan feed patterns prepared for selected one of the first recording mode and the third recording mode according to a length of the record execution area in the sub-scanning direction such that a predetermined sub-scan feed pattern is used for the other of the first recording mode and the third recording mode irrespective of the length of the record execution area.

2. A dot recording apparatus in accordance with claim 1, wherein the function (iv) includes a function of selecting one of the plurality of sub-scan feed patterns prepared for the third recording mode such that the predetermined sub-scan feed pattern is used for the first recording mode, and a function of determining dot positions to be recorded by each dot forming element during each main scan in the third recording mode on the basis of dot recording history down to the lower end of the record execution area in the second recording mode.

3. A dot recording apparatus in accordance with claim 2, wherein the plurality of sub-scan feed patterns prepared for the third recording mode use mutually different amounts for a transient sub-scan feed, if required, which is carried out at the beginning of the third recording mode, and
   wherein the function (iv) includes a function of selecting one of the plurality of sub-scan feed patterns for the third recording mode based on the dot recording history down to the lower end of the record execution area.

4. A dot recording apparatus in accordance with claim 3, wherein the second recording mode executes sub-scan feeds while repeatedly using a sequence of non-constant feed amounts as one unit cycle, and
   the third recording mode executes sub-scan feeds while repeatedly using a constant feed amount corresponding to a plurality of dots after the transient sub-scan feed.

5. A dot recording apparatus in accordance with claim 4, wherein necessity of the transient sub-scan feed in the third recording mode and an amount of the transient sub-scan feed are determined according to an amount of a sub-scan feed by which a lower-end element of the plurality of dot forming elements reaches a position on or after a lower end line of the record execution area on the assumption that sub-scan feeds are to be continued in the second recording mode.

6. A dot recording apparatus in accordance with claim 4, wherein necessity of the transient sub-scan feed in the third recording mode and an amount of the transient sub-scan feed are determined according to a value Vres defined by:

$$Vres=\{(Lp-\Delta L-Ln)\%\Sigma\}$$

where Lp denotes a length of the record execution area in the sub-scanning direction; ΔL denotes a distance between an upper end of the record execution area and an upper end of an area to be recorded in the second recording mode; Ln denotes a distance between dot forming elements on both ends of the dot recording head; Σ denotes a total of sub-scan feeds in one unit cycle of sub-scan feeds in the second recording mode; and an operator "%" denotes an operation of taking a remainder of a division.

7. A dot recording apparatus in accordance with claim 1, wherein the plurality of sub-scan feed patterns prepared for the first recording mode have an identical constant sub-scan feed amount but different number of sub-scan feeds, wherein the second recording mode executes sub-scan feeds while repeatedly using a sequence of non-constant feed amounts as one unit cycle, and wherein the function (iv) includes a function of determining the number of sub-scan feeds in the first recording mode such that the predetermined sub-scan feed pattern is applied for the third recording mode.

8. A dot recording apparatus in accordance with claim 7, wherein the number of sub-scan feeds in the first recording mode is determined such that a positional relationship between the dot recording head at a final recording position in the second recording mode and the lower end of the record execution area is within a predetermined range.

9. A dot recording apparatus in accordance with claim 8, wherein the number of sub-scan feeds in the first recording mode is determined according to a value Vres defined by:

$$Vres=\{(Lp-\Delta L-Ln)\%\Sigma\}$$

where Lp denotes a length of the record execution area in the sub-scanning direction; ΔL denotes a distance between an upper end of the record execution area and an upper end of an area to be recorded in the second recording mode; Ln denotes a distance between dot forming elements on both ends of the dot recording head; Σ denotes a total of sub-scan feeds in one unit cycle of sub-scan feeds in the second recording mode; and an operator "%" denotes an operation of taking a remainder of a division.

10. A dot recording apparatus in accordance with claim 1, wherein the head drive unit intermittently drives the plurality of dot forming elements during each main scan in each of the first through third recording modes so that the plurality of dot forming elements are disabled for (s−1) dot positions among every s dots in a main scanning direction where s is an integer greater than 1.

11. A method of recording dots on a recording medium with a dot recording head having a plurality of dot forming elements arranged thereon, the method comprising the steps of:

(a) driving at least one of the dot recording head and the recording medium to carry out a main scan;

(b) driving at least part of the plurality of dot forming elements during the main scan to create dots; and (c) driving at least one of the dot recording head and the recording medium to carry out a sub-scan every time when the main scan is completed, the plurality of dot forming elements forming a plurality of dots of an identical color arrayed at a substantially constant pitch in a sub-scanning direction, wherein (i) dot recording is executed according to a first recording mode in the vicinity of an upper end of a record execution area of the recording medium while repeatedly executing the steps (a) through (c);

(ii) dot recording is executed according to a second recording mode in a middle portion of the record execution area while repeatedly executing the steps (a) through (c);

(iii) dot recording is executed according to a third recording mode in the vicinity of a lower end of the record execution area, the third recording mode being different from the second recording mode at least in a sub-scan feed amount; and (iv) one of a plurality of sub-scan feed patterns prepared for selected one of the first recording mode and the third recording mode is selected according to a length of the record execution area in the sub-scanning direction such that a predetermined sub-scan feed pattern is used for the other of the first recording mode and the third recording mode irrespective of the length of the record execution area.

12. A method in accordance with claim 11, wherein one of the plurality of sub-scan feed patterns prepared for the third recording mode is selected such that the predetermined sub-scan feed pattern is used for the first recording mode, and a function of determining dot positions to be recorded by each dot forming element during each main scan in the third recording mode on the basis of dot recording history down to the lower end of the record execution area in the second recording mode.

13. A method in accordance with claim 12, wherein the plurality of sub-scan feed patterns prepared for the third recording mode use mutually different amounts for a transient sub-scan feed, if required, which is carried out at the beginning of the third recording mode, and wherein one of the plurality of sub-scan feed patterns for the third recording mode is selected based on the dot recording history down to the lower end of the record execution area.

14. A method in accordance with claim 13, wherein the second recording mode executes sub-scan feeds while repeatedly using a sequence of non-constant feed amounts as one unit cycle, and the third recording mode executes sub-scan feeds while repeatedly using a constant feed amount corresponding to a plurality of dots after the transient sub-scan feed.

15. A method in accordance with claim 14, wherein necessity of the transient sub-scan feed in the third recording mode and an amount of the transient sub-scan feed are determined according to an amount of a sub-scan feed by which a lower-end element of the plurality of dot forming elements reaches a position on or after a lower end line of the record execution area on the assumption that sub-scan feeds are to be continued in the second recording mode.

16. A method in accordance with claim 14, wherein necessity of the transient sub-scan feed in the third recording mode and an amount of the transient sub-scan feed are determined according to a value Vres defined by:

$$Vres=\{(Lp-\Delta L-Ln)\%\Sigma\}$$

where Lp denotes a length of the record execution area in the sub-scanning direction; ΔL denotes a distance between an upper end of the record execution area and an upper end of an area to be recorded in the second recording mode; Ln denotes a distance between dot forming elements on both ends of the dot recording head; Σ denotes a total of sub-scan feeds in one unit cycle of sub-scan feeds in the second recording mode; and an operator "%" denotes an operation of taking a remainder of a division.

17. A method in accordance with claim 11, wherein the plurality of sub-scan feed patterns prepared for the first recording mode have an identical constant sub-scan feed amount but different number of sub-scan feeds, wherein the second recording mode executes sub-scan feeds while repeatedly using a sequence of non-constant feed amounts as one unit cycle, and wherein the number of sub-scan feeds in the first recording mode is determined such that the predetermined sub-scan feed pattern is applied for the third recording mode.

18. A method in accordance with claim 17, wherein the number of sub-scan feeds in the first recording mode is determined such that a positional relationship between the dot recording head at a final recording position in the second recording mode and the lower end of the record execution area is within a predetermined range.

19. A method in accordance with claim 18, wherein the number of sub-scan feeds in the first recording mode is determined according to a value Vres defined as:

$$Vres=\{(Lp-\Delta L-Ln)\%\Sigma\}$$

where Lp denotes a length of the record execution area in the sub-scanning direction; ΔL denotes a distance between the upper end of the record execution area and an upper end of a specific area where recording is carried out in the second recording mode, Ln denotes a distance between dot forming elements on both ends of the dot print head; δ denotes a fixed value relating to the positional relationship between the dot recording head at the final recording position in the second recording mode and the lower end of the record execution area; Σ denotes a total of sub-scan feeds in one feed cycle in the second recording mode; and an operator "%" denotes an operation of taking a remainder of a division.

20. A method in accordance with claim 11, wherein the plurality of dot forming elements are intermittently driven during each main scan in each of the first through third recording modes so that the plurality of dot forming elements are disabled for (s−1) dot positions among every s dots in a main scanning direction where s is an integer greater than 1.

21. A computer program product for use in a dot recording apparatus including a computer and a dot recording head having a plurality of dot forming elements, the computer program product comprising:

a computer readable medium; and a computer program stored on the computer readable medium, the computer program causing the computer to implement the functions of:

(i) executing dot recording according to a first recording mode in the vicinity of an upper end of a record execution area of the printing medium;

(ii) executing dot recording according to a second recording mode in a middle portion of the record execution area;

(iii) executing dot recording according to a third recording mode in the vicinity of a lower end of the record execution area, the third recording mode being different from the second recording mode at least in a sub-scan feed amount; and (iv) selecting one of a plurality of sub-scan feed patterns prepared for selected one of the first recording mode and the third recording mode according to a length of the record execution area in the sub-scanning direction such that a predetermined sub-scan feed pattern is used for the other of the first recording mode and the third recording mode irrespective of the length of the record execution area.

* * * * *